(12) United States Patent
Ong et al.

(10) Patent No.: US 10,797,617 B2
(45) Date of Patent: Oct. 6, 2020

(54) ELECTROMECHANICAL TRANSDUCER

(71) Applicant: COMMONWEALTH SCIENTIFIC AND INDUSTRIAL RESEARCH ORGANISATION, Campbell, Australian Capital Territory (AU)

(72) Inventors: Andojo Ongkodjojo Ong, Sandy Bay (AU); Paulo Antonio De Souza, Jr., Blacksman Bay (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 756 days.

(21) Appl. No.: 15/324,421

(22) PCT Filed: Jul. 7, 2015

(86) PCT No.: PCT/AU2015/050383
§ 371 (c)(1),
(2) Date: Jan. 6, 2017

(87) PCT Pub. No.: WO2016/004476
PCT Pub. Date: Jan. 14, 2016

(65) Prior Publication Data
US 2017/0179850 A1  Jun. 22, 2017

(30) Foreign Application Priority Data

Jul. 7, 2014  (AU) .................................. 2014902621

(51) Int. Cl.
*H02N 1/08* (2006.01)
*F03G 5/06* (2006.01)
*F03G 7/08* (2006.01)

(52) U.S. Cl.
CPC .................. *H02N 1/08* (2013.01); *F03G 5/06* (2013.01); *F03G 7/08* (2013.01)

(58) Field of Classification Search
CPC .................. H02N 1/08; F03G 5/06; F03G 7/08
See application file for complete search history.

(56) References Cited

U.S. PATENT DOCUMENTS

2001/0033121 A1* 10/2001 Nguyen ............... H03H 3/0078
310/316.01
2010/0045119 A1*  2/2010 Jackson .................... F03G 7/08
310/20
(Continued)

FOREIGN PATENT DOCUMENTS

CN         102148587      8/2011
JP         2009-509495 A  3/2009
JP         2013-24762 A   2/2013

OTHER PUBLICATIONS

English Translation of JP 2013-024762 (Year: 2013).*
(Continued)

*Primary Examiner* — Bryan P Gordon
(74) *Attorney, Agent, or Firm* — Nixon & Vanderhye P.C.

(57) ABSTRACT

An electromechanical transducer, including: one or more first mechanical resonator structures having respective first fundamental oscillation resonance frequencies; and a second mechanical resonator structure including one or more electromechanical transducer components, and having a second fundamental oscillation resonance frequency that is substantially greater than the first fundamental resonance frequencies of the first mechanical resonator structures; wherein oscillations of the first mechanical resonator structures driven by external mechanical vibrations cause the first mechanical resonator structures to intermittently couple with the second resonating structure to drive oscillations of the second resonating structure such that the electromechanical transducer components of the second mechanical resonator structure convert the oscillations of the second resonating structure to electrical energy or signals.

8 Claims, 22 Drawing Sheets

(56) References Cited

U.S. PATENT DOCUMENTS

| | | | | |
|---|---|---|---|---|
| 2010/0127798 A1* | 5/2010 | Ayazi | ................... | H03H 9/2463 |
| | | | | 333/186 |
| 2011/0193350 A1 | 8/2011 | Rastegar et al. | | |
| 2012/0267900 A1* | 10/2012 | Huffman | ................ | H02N 2/186 |
| | | | | 290/1 R |
| 2016/0153781 A1* | 6/2016 | Blomqvist | ......... | G01C 19/5719 |
| | | | | 73/504.12 |

OTHER PUBLICATIONS

International Search Report for PCT/AU2015/050383 dated Sep. 21, 2015, 3 pages.
Notification of Reason(s) for Rejection dated May 7, 2019 in Japanese Application No. 2017-501262, with English translation (18 pages).

* cited by examiner (a)

(b)

(c)

(a)

(b)

ELECTROMECHANICAL TRANSDUCER

This application is the U.S. national phase of International Application No. PCT/AU2015/050383 filed 7 Jul. 2015 which designated the U.S. and claims priority to AU Patent Application No. 2014902621 filed 7 Jul. 2014, the entire contents of each of which are hereby incorporated by reference.

TECHNICAL FIELD

The present invention relates to an electromechanical transducer, a process for producing an electromechanical transducer, and a process for electromechanical transduction, including energy harvesting, in which mechanical vibrations are converted into electrical energy or signals.

BACKGROUND

Energy harvesters (also known as "energy scavengers") are devices or structures that convert ambient energy into a form that can be used by another device or system. In particular, micron-scale energy harvesters have been developed to convert mechanical vibrations from the ambient environment into electrical energy. However, existing energy harvesting devices and structures suffer from various difficulties, including undesirably complex structures that are difficult to manufacture and are unlikely to be reliable in practice.

It is desired, therefore, to address or alleviate one or more difficulties of the prior art, or to at least provide a useful alternative.

SUMMARY

In accordance with some embodiments of the present invention, there is provided an electromechanical transducer, including:
  one or more first mechanical resonator structures having respective first fundamental oscillation resonance frequencies; and
  a second mechanical resonator structure including one or more electromechanical transducer components, and having a second fundamental oscillation resonance frequency that is substantially greater than the first fundamental resonance frequencies of the first mechanical resonator structures;
  wherein oscillations of the first mechanical resonator structures driven by external mechanical vibrations cause the first mechanical resonator structures to intermittently couple with the second resonating structure to drive oscillations of the second resonating structure such that the electromechanical transducer components of the second mechanical resonator structure convert the oscillations of the second resonating structure to electrical energy or signals.

In some embodiments, the one or more first mechanical resonator structures are a plurality of first mechanical resonator structures.

In some embodiments, the plurality of first mechanical resonator structures have respective different first fundamental oscillation resonance frequencies.

In some embodiments, the external mechanical vibrations span a range of frequencies, and the respective different first fundamental oscillation resonance frequencies collectively and substantially correspond to that range of frequencies.

In some embodiments, the first mechanical resonator structures are mutually independent.

In some embodiments, the first mechanical resonator structures are mutually coupled by coupling springs.

In some embodiments, each said first mechanical resonator structure includes a proof mass suspended by serpentine springs.

In some embodiments, the serpentine springs are arranged such that the oscillations of each proof mass said first mechanical resonator structure are in alternating directions directed towards and away from the corresponding serpentine leaf springs that support the proof mass.

In some embodiments, the second mechanical resonator structure includes a proof mass suspended by elongate beams such that the oscillations of the second mechanical resonator structure are in opposing directions that are orthogonal to the longitudinal axes of the elongate beams.

In some embodiments, each said first mechanical resonator structure includes one or more coupling members extending towards the second resonating structure such that oscillations of the first mechanical resonator structure cause the coupling members to intermittently press against the second resonating structure and thus drive the oscillations of the second resonating structure.

In some embodiments, the spatial dimensions of the first and second mechanical resonator structures are less than 4 mm.

In accordance with some embodiments of the present invention, there is provided an energy harvester including any one of the above electromechanical transducers.

In accordance with some embodiments of the present invention, there is provided an electromechanical transduction process, including:
  coupling mechanical vibrations to one or more first mechanical resonator structures having respective first fundamental oscillation resonance frequencies corresponding to respective frequencies of the mechanical vibrations, such that the coupling causes one or more of the first mechanical resonator structures to oscillate;
  coupling the oscillations of the first mechanical resonators structures to a second mechanical resonator structure including one or more electromechanical transducer components and having a second fundamental oscillation resonance frequency that is substantially greater than the first fundamental resonance frequencies of the first mechanical resonator structures, such that the oscillations of the first mechanical resonator structures drive oscillations of the second resonating structure and the electromechanical transducer components of the second resonating structure convert the oscillations of the second resonating structure to electrical energy or signals.

In some embodiments, the one or more first mechanical resonator structures are a plurality of first mechanical resonator structures.

In some embodiments, the plurality of first mechanical resonator structures have respective different first fundamental oscillation resonance frequencies.

In accordance with some embodiments of the present invention, there is provided an electromechanical transducer including structures configured to perform any one of the above processes.

In accordance with some embodiments of the present invention, there is provided a process for producing a micromachined electromechanical transducer, including:
  determining a range of frequencies of external mechanical vibrations;

producing a plurality of first mechanical resonator structures having respective different first fundamental oscillation resonance frequencies substantially and collectively corresponding to the range of frequencies of the external mechanical vibrations;

producing a second mechanical resonator structure including one or more electromechanical transducer components, and having a second fundamental oscillation resonance frequency that is substantially greater than the first fundamental resonance frequencies of the first mechanical resonator structures;

wherein the first mechanical resonator structures and the second mechanical resonator structure are configured such that oscillations of the first mechanical resonator structures driven by external mechanical vibrations within said range of frequencies cause the first mechanical resonator structures to intermittently couple with the second resonating structure to drive oscillations of the second resonating structure such that the electromechanical transducer components of the second resonating structure convert the oscillations of the second resonating structure to electrical energy or signals.

In some embodiments, the one or more first mechanical resonator structures are a plurality of first mechanical resonator structures.

In some embodiments, the plurality of first mechanical resonator structures have respective different first fundamental oscillation resonance frequencies.

In some embodiments, the process includes mounting the first mechanical resonator structures and the second mechanical resonator structure to a source of mechanical vibrations within said range of frequencies such that the oscillations of the first mechanical resonator structures and the second mechanical resonator structure are substantially aligned with corresponding mechanical vibrations of the source of mechanical vibrations.

In some embodiments, the oscillations of the first mechanical resonator structures and the oscillations of the second mechanical resonator structure are lateral oscillations.

In some embodiments, the oscillations of the first mechanical resonator structures and the oscillations of the second mechanical resonator structure are lateral oscillations parallel to a common substrate.

BRIEF DESCRIPTION OF THE DRAWINGS

Some embodiments of the present invention are hereinafter described, by way of example only, with reference to the accompanying drawings, wherein.

DETAILED DESCRIPTION

Figure 1:
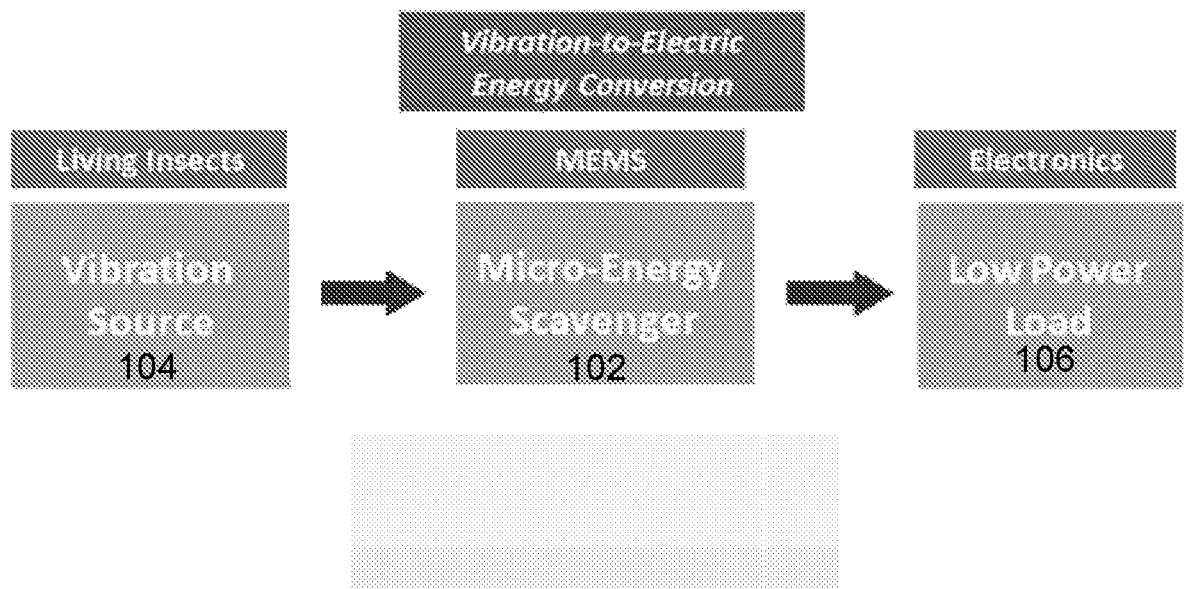
FIG. 1 is a schematic diagram illustrating the use of energy harvesting or scavenging of mechanical vibrations to supply electrical power.

FIG. 1 is a schematic diagram illustrating the use of an "energy harvester" or "energy scavenger" 102 to harvest ambient or environmental energy in the form of mechanical vibrations from a vibration source 104 in order to provide electrical energy to a load and/or energy storage device 106. Accordingly, such devices are electromechanical transducers because they convert mechanical energy to electrical energy (and, in general, vice versa). Embodiments of the present invention are hereinafter described in the context of micro-electro-mechanical systems (MEMS) structures attached to living insects in order to harvest a portion of the insects' kinetic energy to power electronic circuitry also attached to the insects for the purpose of environmental sensing. However, it will be apparent to those skilled in the art that the devices and structures described herein can be more broadly employed to generate electrical energy and/or signals from a wide range of possible vibration sources and vibration frequencies and for a wide range of possible uses.

In the context of the described embodiments, the described energy harvesting devices or assemblies are configured to generate electrical power from the mechanical vibrations resulting from the flights and other physical activities of a bee to which the device or structure is attached. The described energy harvesters have physical dimensions of only a few square millimeters and a volume of at most a few cubic millimetres, and thus are suitable form for attachment to a bee or other living insect. However, it will be apparent to those skilled in the art that the electromechanical transducers described herein can be provided in a wide variety of different configurations in different length scales, depending on the requirements of the desired application.

Although not described in detail herein, it will be appreciated by those skilled in the art that the resulting electrical energy can be stored in one or more further micron-scale capacitors and subsequently utilized to provide electrical power of up to several hundred micro-watts or sub-milli-watts, sufficient to operate low power MEMS sensors and/or integrated circuits such as low-power wireless transmitters and/or receivers. Additionally, the described energy harvesting devices can be used in conjunction with micro-batteries and/or microscopic solar cells to provide a maintenance-free autonomous power system.

Thus the described energy harvesting devices can be used to provide low-maintenance, autonomous systems, and are particularly useful for powering miniaturised systems operating in poorly accessible and/or hostile environments. The described energy harvesting devices/structures are also expected to have a longer lifetime, improved stability, and lower environmental impacts compared to other energy harvesting devices such as micro-batteries and micro-fuel cells.

Figure 2:
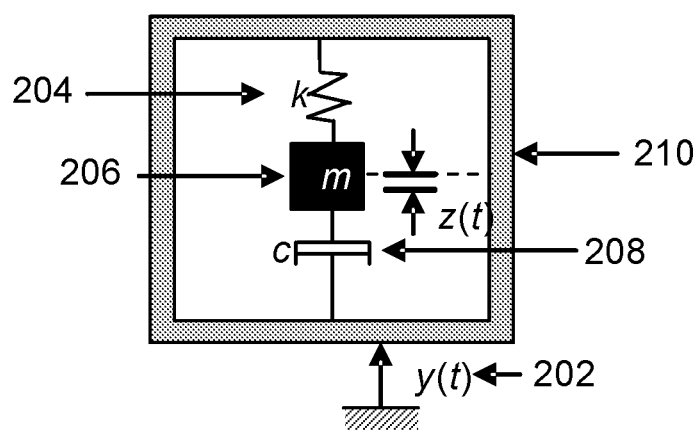
FIG. 2 is a schematic diagram of a generic model of a simple vibration-driven generator.

The general working principle of an electromechanical vibration energy harvester is illustrated in FIG. 2. Simply put, a portion of the kinetic energy caused by external vibrations 202 is converted into electrical energy via a spring coupled 204 inertial or 'proof' mass 206 coupled to a damping component 208 in the form of one or more variable capacitors. Electrostatic transduction via variable capacitors was chosen for the energy harvesters described herein because MEMS capacitors are relatively straightforward to fabricate and generally have smaller physical dimensions compared with other forms of electromechanical transducer (such as piezoelectric and electromagnetic transducers).

Electrostatic transduction also facilitates integration with micro-electronics (i.e. on-chip integration), but requires a voltage bias for the conversion process to occur. This difficulty is addressed by charging the capacitor initially or by employing an electret charging material.

A variable capacitor can generate electrical power from vibration in either of two operating modes. If the charge on the capacitor is constrained, then the voltage across the capacitor increases as the capacitance changes due to the changing separation between the capacitor plates caused by the vibrations. Conversely, if the voltage across the capacitor is constrained, then charge flows to and from the capacitor as the capacitance changes due to the vibration. In the described embodiments, the charge constrained mode of operation was chosen because the voltage constrained mode requires two separate voltage sources, as described in S. Meninger, J. O. Mur-Miranda, R. Amirtharajah, A. P. Chandrakasan, and J. H. Lang, "Vibration-to-Electric Energy Conversion", in *IEEE Transactions on Very Large Scale Integration (VLSI) Systems*, Vol. 9, No. 1, February 2001, pp. 64-76.

Returning to the model of FIG. 2, the capacitance of the MEMS variable capacitor attached to the inertial mass 206 at a given time is determined by the displacement z(t) of the inertial mass 206 relative to the housing 210, which is driven by the external vibration y(t) 202. The resulting displacement and its natural frequency can be measured to calculate an equivalent amount of power based on electrostatic approximations, as described in P. D. Mitcheson, T. C. Green, E. M. Yeatman, and A. S. Holmes, "Architectures for Vibration-Driven Micropower Generators", *IEEE/ASME Journal of Microelectromechanical Systems*, Vol. 13, No. 3, pp. 429-440, 2004:

$$P_{res} = \frac{1}{2} Y_0^2 \omega^3 m \frac{x}{Y_0} \quad (1)$$

where $Y_0$, $\omega$, m, and x are source motion amplitude (m), driving frequency in Hz (driving frequency of the vibration source should ideally be the same as the natural frequency of the device), the device mass (kg), and the inertial mass displacement (m), respectively. Thus, the power $P_{res}$ can be generated at resonance with a setting of $\omega_c=1$ ($\omega_c=(\omega/\omega_n)$, where $\omega_n$ is the natural frequency of the comb-drive microresonator (Hz)).

In the described embodiments, the energy harvesting devices include a MEMS variable capacitor in the form of a comb drive constituted by interdigitated sets of elongate or 'finger' electrodes, one set being fixed and the other being part of a resonator, configured so that the degree of in-plane overlap between the two sets of finger electrodes (and hence the capacitance and voltage) is determined by the displacement of the resonator relative to the fixed substrate to which it is mounted.

In order to increase the transduction or conversion efficiency, the displacements of the lateral resonator should be as large as practically possible within the limits of the capacitor, meaning that the resonant frequency of the oscillations of the resonator structure should be at or close to a frequency of the mechanical vibrations.

However, this requirement poses difficulties in situations where the aim is to generate electrical power from a relatively broad range of external vibration frequencies. For example, in the present case where the aim is to generate power from the vibrations of active bumble bees such as *Bombus terrestris*, these vibrations are characterised by fundamental frequencies in a relatively broad range of approximately 100 Hz to 400 Hz, with harmonics up to about 2 kHz.

In order to address this difficulty posed by broadband ambient vibrations, the energy harvesters described herein can be configured to efficiently absorb frequencies within a broad range of frequencies by including multiple resonators having respective different resonant frequencies collectively corresponding to the frequency range of the ambient vibrations.

However, a further difficulty is that the efficiency of electrostatic transduction is proportional to the third power of the frequency of relative displacement of the capacitor plates, meaning that in situations such as the present example where the frequencies of the external vibrations that drive the energy harvester are relatively low, this will result in correspondingly poor energy conversion efficiencies.

In order to address this difficulty posed by the frequency dependence of electrostatic transduction in situations where the frequencies of the external vibrations are relatively low, the described energy harvesters include a further resonator that has a relatively high lateral oscillation fundamental resonant frequency. By mechanically coupling this further resonator to the one or more relatively low frequency resonators, the oscillations of the relatively low frequency resonators are effectively up-converted to a higher frequency by the further resonator. By including one or more variable capacitor transducers as part of the high frequency resonator, the efficiency of energy conversion is greatly enhanced.

Although the described energy harvesters or scavengers or transducers are conveniently described as devices or structures, in view of their composite nature, it is also considered appropriate to refer to the described embodiments of the present invention as assemblies of structures. However, these terms should be considered as interchangeable in this specification unless the context indicates otherwise.

Figure 3:
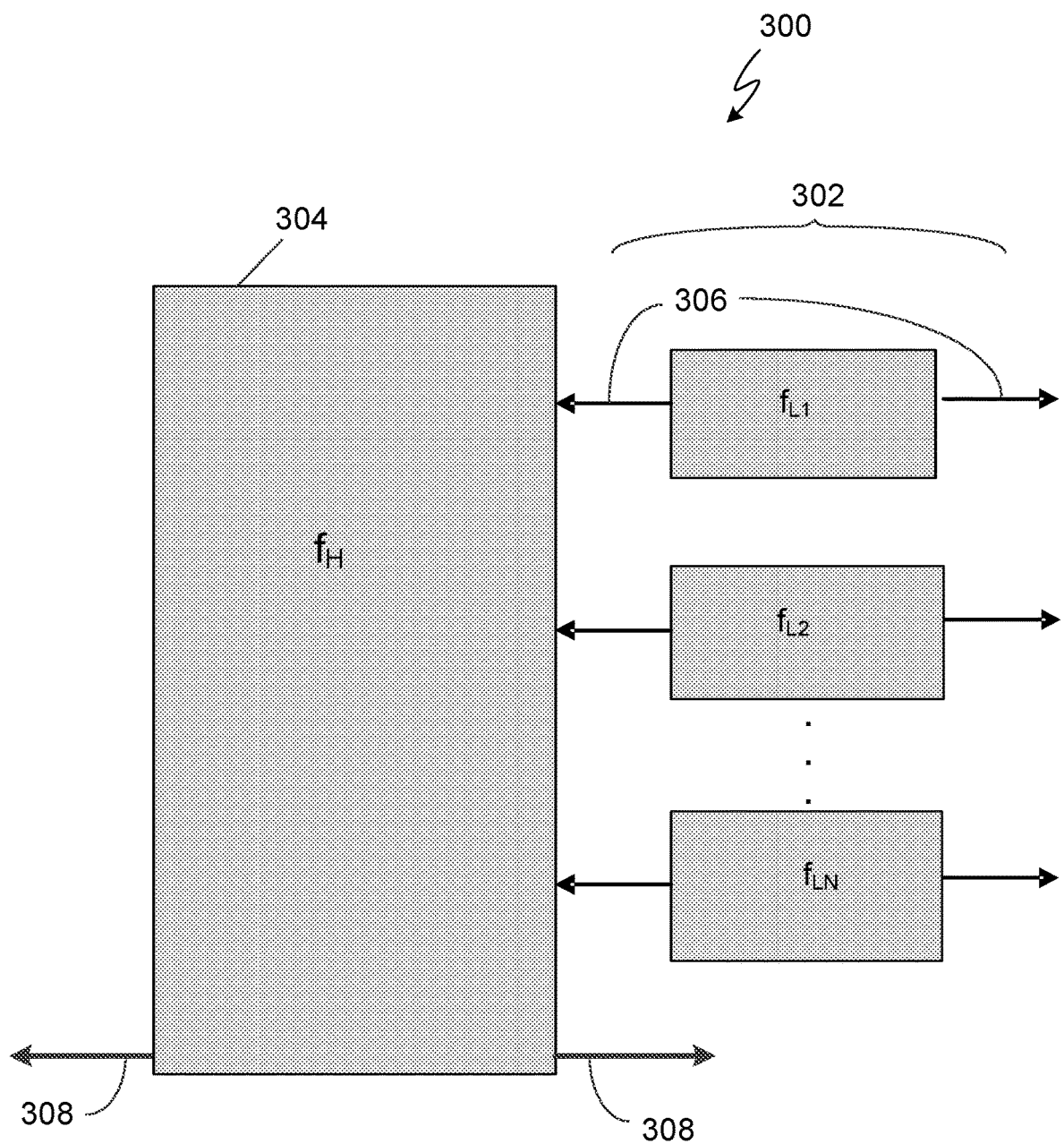
FIG. 3 is a block diagram of an energy harvesting device in accordance with the described embodiments of the present invention, in which one or more relatively low frequency lateral resonators are arranged to couple vibrational energy to a relatively high frequency lateral resonator.

FIG. 3 is a schematic diagram illustrating the general configuration of energy harvesting devices 300 in accordance with the present invention. Each device or assembly 300 includes one or more first mechanical resonator structures 302 and a second mechanical resonator structure 304.

As will be appreciated by those skilled in the art, in general a mechanical structure has at least one mechanical resonance frequency, and typically has multiple resonance frequencies, including harmonics or multiples of the lowest or fundamental resonance frequency. Purely for convenience of description, the term "resonance frequency" and its variants should be generally understood in this specification as referring to the fundamental or lowest frequency resonance mode of a structure, except where the context indicates otherwise. In particular, in the context of the described mechanical resonator structures, the term "resonant frequency" generally should be understood is referring to the frequency of the fundamental or lowest frequency oscillation resonant mode of a structure, generally corresponding to the resonance mode that provides the greatest displacement.

The one or more first mechanical resonator structures 302 have respective fundamental lateral oscillation resonance frequencies $f_{L1}, f_{L2}, \ldots f_{LN}$ (and are therefore also referred to herein as 'lateral resonators'). That is, in various embodiments, there may be only one first mechanical resonator structure 302 and hence a single fundamental resonance frequency, or alternatively there may be multiple first mechanical resonator structures 302, but all having the same fundamental oscillation resonance frequency (i.e., $f_{L1}=f_{L2}=\ldots=f_{L(N-1)}=f_{LN}$). However, in the described embodiments where the energy harvesters are configured to generate power from broadband vibration frequencies, the described energy harvesters 300 include a plurality of first mechanical resonator structures 302 having respective different fundamental resonance frequencies. It will be apparent to those skilled in the art that many different combinations of resonance frequencies can be provided in other embodiments.

Mechanical vibrations coupled to the first mechanical resonator structures 302 from the external environment cause the first mechanical resonator structures 302 to oscillate laterally, as represented by the horizontal arrows 306 in FIG. 3. Where these mechanical vibrations cause one or more of the first mechanical resonator structures 302 to oscillate in its or their resonant mode(s), the relative spatial locations of the first and second mechanical resonator structures 302, 304 are such that the maximum displacement of the resonating first mechanical resonator structures 302

(towards the left-hand direction in the representation of FIG. 3) causes them to mechanically couple or engage with the second mechanical resonator structure 304 so as to cause the second mechanical resonator structure 304 to oscillate laterally, as represented by the arrows 308.

The second mechanical resonator structure 304 is configured to have a fundamental oscillation resonance frequency that is substantially greater than any and all of the resonance frequencies of the first mechanical resonator structures 302. Consequently, the coupling of the oscillations of the first mechanical resonator structures 302 to the second mechanical resonator structure 304 has the effect of up-converting the relatively low fundamental resonance frequencies of the first mechanical resonator structures 302 to the relatively high fundamental resonance frequency of the second mechanical resonator structure 304. The second mechanical resonator structure 304 includes one or more electromechanical transducer components that are configured to generate electrical power from the oscillations of the second mechanical resonator structure 304.

By configuring the one or more first mechanical resonator structures 302 to have one or more fundamental oscillation resonance frequencies corresponding to one or more external vibration frequencies, the efficiency of conversion from external vibrations to kinetic energy of the first mechanical resonator structures 302 is increased. Additionally, by up-converting the relatively low fundamental resonance frequencies to the higher fundamental resonance frequency of the second mechanical resonator structure 304, the efficiency of conversion from kinetic energy to electrical energy is also increased.

Figure 4:
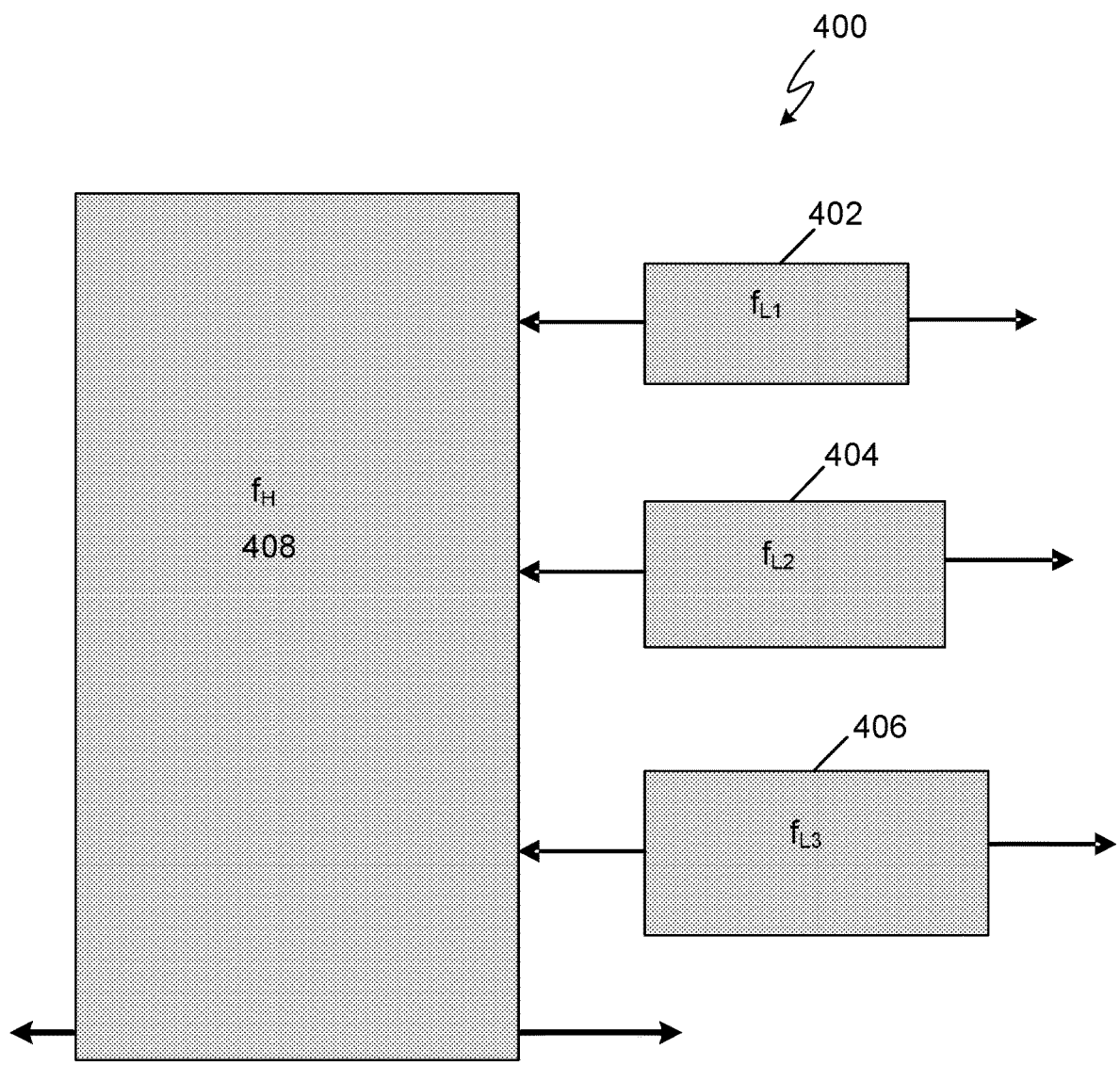
FIG. 4 is a block diagram of an energy harvesting device as shown in FIG. 3, but including three low frequency lateral resonators.

FIG. 4 is a block diagram of an embodiment of an energy harvester 400 having three first mechanical resonator structures 402, 404, 406 having respective different oscillation resonant frequencies $f_{L1}$, $f_{L2}$, and $f_{L3}$ of about 200, 300, and 400 Hz, approximately spanning the measured frequency range of the mechanical vibrations generated by bees.

Figure 5:
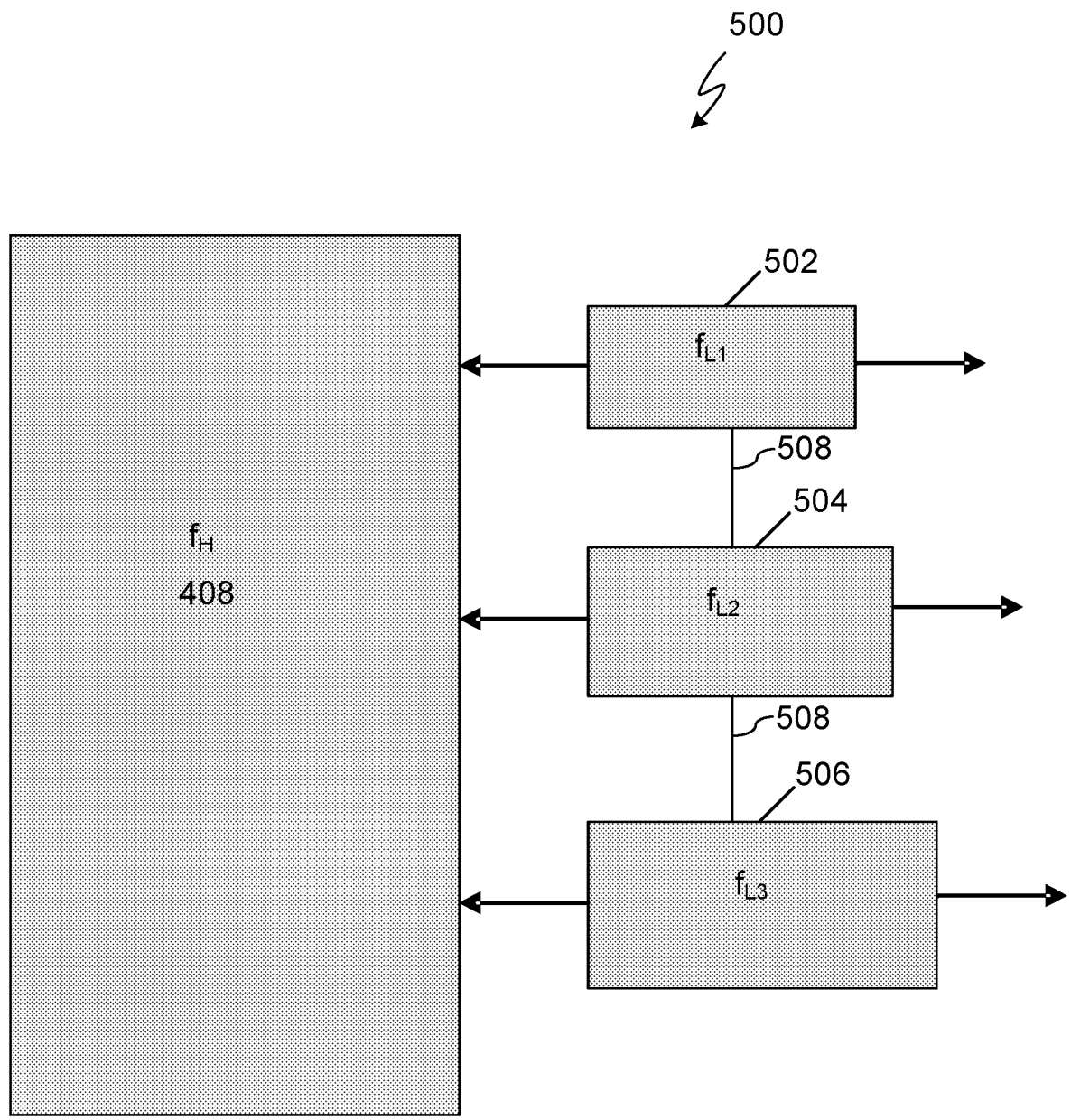
FIG. 5 is a block diagram of an energy harvesting device as shown in FIG. 4, but in which the relatively low frequency lateral resonators are coupled to one another to increase the bandwidth of the low operating frequency range of the device.

In an alternative embodiment 500, as shown in FIG. 5, three first mechanical resonator structures 502, 504, 506 are coupled to one another by coupling springs 508, which have the effect of broadening the collective frequency response of the first mechanical resonator structures 502, 504, 506, and thus the energy harvester 500 as a whole.

Figure 6:
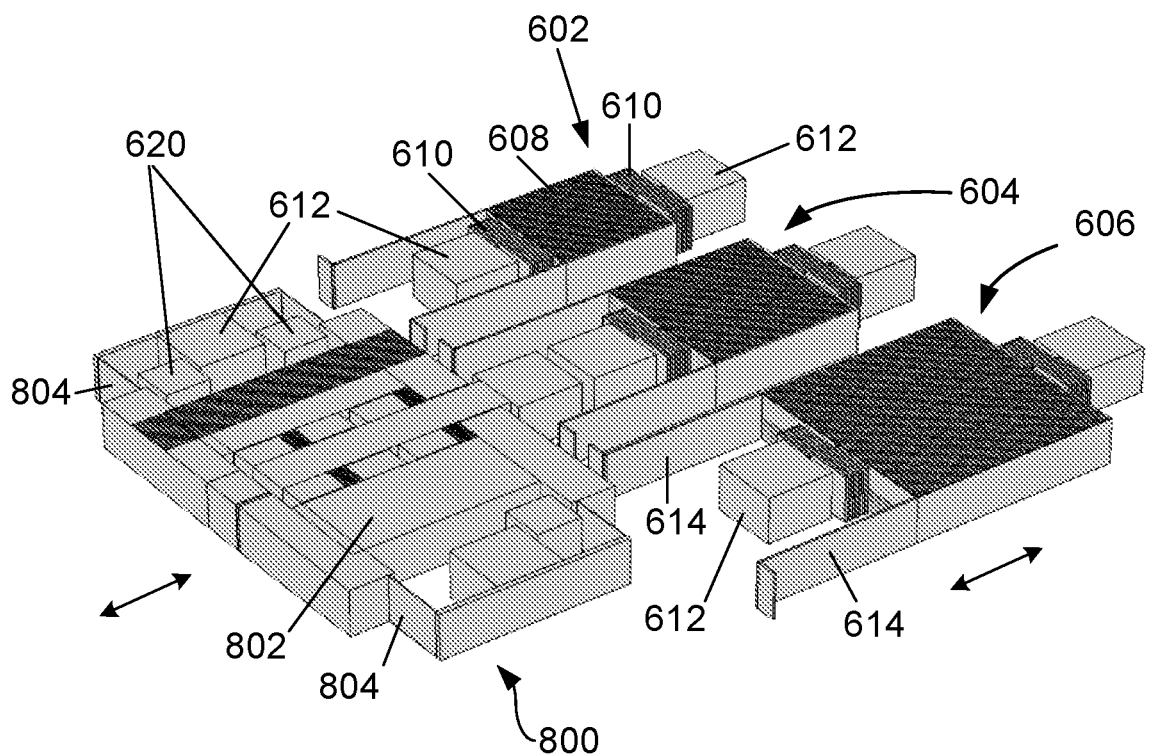
FIG. 6 is an image of a computer-generated model of an embodiment of the energy harvesting device of FIG. 4.

Returning to the simpler configuration of FIG. 4, FIG. 6 shows an embodiment of the energy harvester 400 in which each of the three first mechanical resonator structures (also referred to herein for convenience as the 'low frequency' resonator structures or resonators) 602, 604, 606 takes the form of a floating proof mass 608 suspended above a substrate (not shown) by a pair of serpentine springs 610 at opposite ends of the proof mass 608. Thus one end of each serpentine spring 610 is attached to the corresponding proof mass 608, while the opposite end of the serpentine spring 610 is attached to a corresponding anchor block 612 that anchors the resonator structure to the substrate.

Figure 7:
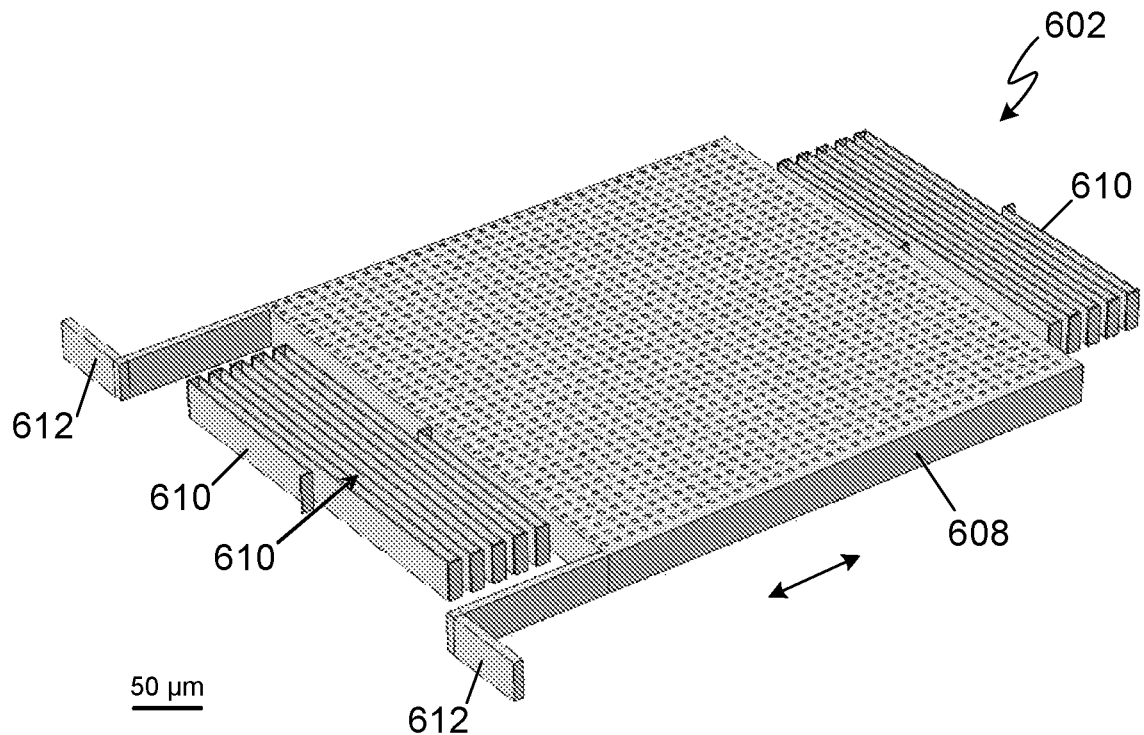
FIG. 7 is an image of a computer-generated model of one of the relatively low frequency lateral resonators of FIG. 6, showing details of the serpentine springs supporting the resonator proof mass.

As represented by the double-headed arrows in FIGS. 6 and 7, the principal oscillation mode of each low frequency mechanical resonator structure is an oscillation of the proof mass 608 towards and away from the corresponding serpentine springs 610 that support the proof mass 608 above the substrate. In this lateral oscillation mode, the low frequency resonators 602, 604, 606 have respective different fundamental resonance frequencies. In general, the fundamental resonance frequency of a given resonator of this general form can be tuned to a desired frequency of interest by selecting an appropriate mass for the proof mass 608, and by selecting an appropriate configuration of the corresponding serpentine springs 610 and the materials of which these components 608, 610 are made. In the embodiment shown in FIG. 6, the different fundamental resonance frequencies are determined by selecting respective different masses for the proof masses 608 of the three low frequency resonators 602, 604, 606, whilst using the same serpentine spring configurations.

In the embodiments shown in FIGS. 6, 7, 10, 13, 14, 15, and 16, each serpentine spring consists of five 'turns' formed by ten elongate parallel beams of rectangular cross-section, with the adjacent ends of each successive pair of these elongate beams being interconnected by a corresponding short joining beam. As will be appreciated by those skilled in the art, other spring configurations can be used in other embodiments, including springs similar to those shown but using a different number of turns, and that in general, the addition of more turns decreases the stiffness of such springs, and thus lowers the fundamental frequency of the corresponding lateral oscillator.

Returning to FIG. 6, each of the low frequency resonators 602, 604, 606 also includes a pair of arms 614 extending from its proof mass 608 towards the nearby high frequency resonator structure 800. As shown in more detail, FIG. 8, the second or "high frequency" resonator structure 800 includes a floating proof mass 802 suspended above the substrate (not shown) by four elongate support beams 804 attached near respective corners of the proof mass 802. Due to this arrangement, the principal oscillation mode of the high frequency resonator structure 800 is also a lateral oscillation mode parallel to those of the low frequency resonators 602, 604, 606, and orthogonal to the longitudinal axes of the elongate support members or arms 804. These elongate support members or arms 804 also act as springs to return the proof mass 802 of the high frequency resonator structure 800 to its equilibrium position. Relative to the serpentine springs 610 of the low frequency resonators 602, 604, 606, the straight elongate configuration of the support arms 804 makes them substantially stiffer than the serpentine springs 610 of the low frequency resonator structures 602, 604, 606, resulting in the high frequency resonator structure 800 having a substantially higher lateral oscillation fundamental resonance frequency, in the embodiments described below being about 3.5 kHz or about an order of magnitude higher than those of the low frequency resonators 602, 604, 606.

In order for the high frequency resonator structure 800 to act as an electromechanical transducer, the kinetic energy of the laterally oscillating proof mass 802 is converted to electrical energy by four variable capacitors 806, each being in the form of a set of mutually spaced interdigitated 'finger' electrodes whose general form will be familiar to those skilled in the art.

The energy harvesting structures of FIG. 6 can be fabricated using standard MEMS fabrication methods known to those skilled in the art, including masked high aspect ratio or deep reactive ion etching (DRIE) of a silicon on insulator (SOI) wafer.

DRIE is the preferred process technology for forming the resonant structures described herein because it can form very high aspect ratio structures; in the embodiment described below, it is used to form deep and narrow trenches that are as small as 2 μm in width and extending down through the full 20 μm thickness of the surface silicon layer of an SOI wafer, corresponding to an aspect ratio of 10. Such thick structures are generally desirable in the context of the described embodiments of the present invention because the mass and capacitance of the described structures are both proportional to their thickness, and increases in these parameters provide corresponding increases in the electrical power generated by the energy harvesters. The use of thick interdigitated finger electrodes as the variable capacitors also ensures that the sensing capacitance is much greater than the parasitic capacitances of the device.

To further increase the conversion efficiency of the described energy harvesters, their physical foot-print or volume can be increased to provide corresponding increases in mass and capacitance. Additionally, considering that silicon has a relatively low mass density, in embodiments where the proof mass is initially fabricated from silicon, a mass of a higher mass density material can be attached to or deposited on the silicon proof mass in order to increase the total proof mass, albeit at the expense of increased manufacturing complexity.

In general, high-aspect ratio micro-structures such as those described herein can be easily designed to be low frequency resonators for given dimensional constraints of footprint area and total volume. The natural or fundamental resonance frequency of a given resonator structure can be decreased (or increased) by increasing (or decreasing) the length of its supporting beams/springs and its proof mass. However, such increases in length and mass increase the footprint area and/or the total volume of the resonator structure, and consequently of the overall device. Consequently, in the context of embodiments where there is a competing general desire for the energy harvesters to be as small (and/or, in some situations, as light) as possible (such as those described herein, where the energy harvesters are configured for attachment to a living insect), there is a trade-off between the requirements for low footprint and volume (and/or possibly mass) on the one hand, and high power output on the other.

In view of this trade-off, and in order to achieve as high a power output as possible while occupying only a small area and volume (typically only a few mm$^2$ and mm$^3$), the energy harvesting micro-devices described below were designed using the optimization method described in A. Ongkodjojo and F. E. H. Tay, "*Global Optimization and Design for Microelectromechanical Systems Devices Based on Simulated Annealing*", *Journal of Micromechanics and Microengineering*, Vol. 12, pp. 878-897, 2002 ("Ongkodjojo").

Design and Optimisation

Table 1 summarises the key performance requirements of an energy harvester for generating electrical power from the mechanical vibrations generated by the physical activities of a bee to which the energy harvester is attached. In general, the design of the energy harvester depends on its overall architecture, the location of the energy harvester on the insect's body, the overall size of the energy harvester, the correspondence between the harvester's resonant frequency/ies and the driving frequency/ies from external vibrations, and the mechanical structure of the resonators, in terms of their mass, springs (supporting beams), maximum displacement, and low damping factor (high quality factor).

As discussed above, due to the design trade-off between the natural frequency of each low frequency resonator and the overall size of the energy harvester, the proposed configuration is optimized to achieve the application requirements while satisfying the device size constraints. Moreover, the ratio between the resulting displacement and the source motion amplitude should be more than 0.1 (see P. D. Mitcheson, T. C. Green, E. M. Yeatman, and A. S. Holmes, "Architectures for Vibration-Driven Micropower Generators", *IEEE/ASME Journal of Microelectromechanical Systems*, Vol. 13, No. 3, pp. 429-440, 2004 ("Mitcheson").).

TABLE 1

Key performance specifications for energy harvesting applications

| No | Parameter | Description | Values |
|---|---|---|---|
| 1 | $P_{out}$*) | Maximum output power | ≥40 µW |
| 2 | $f_r$+) | Natural frequency of the micro-generator | <400 Hz |
| 3 | $Z_{max}/Y_0$ | Ratio between the maximum displacement of the energy harvester and the source motion amplitude of the external vibration for optimal generator at resonance | >0.1 |
| 4 | A | Total area of each energy harvesting device (mm$^2$) | ~3 × ~3 |
| 5 | V | Total volume of each energy harvesting device (mm$^3$) | ~3 |

*)The equivalent amount of generating power from vibrations is calculated from the measured displacements using the electrostatic approximations given in Mitcheson.
+)The vibration-based energy-scavenging device generates the maximum power, when its resonant frequency matches the driving frequency of the vibration source. Most common ambient vibrations are below 300 Hz, and the vibration source due to machine is about 2.5 kHz (see Mitcheson).

Spring stiffness is one of the key design parameters of the energy harvesters. The spring constant of the high frequency resonator is given by Eq. (2) below, considering the total number of supporting elongate beams, beam configurations, and series or parallel connections among the beams.

$$k_x = \frac{4Ehw_b^3}{l_b^3}, \quad (2)$$

where E, h, $w_b$, and $l_b$ are Young's Modulus of the silicon material (Pa), beam thickness (m), beam width (m), and beam length (m), respectively.

Furthermore, the spring constant of each low frequency resonator is given by:

$$k_x = \frac{2Ehw_b^3}{N_b l_b^3}, \quad (3)$$

where $N_b$ is the total number of beams to form the single serpentine beam, and the serpentine beams are attached to both ends of the movable plate (proof mass 608) and to the anchors 612. This spring constant is much smaller than the spring constant of the high frequency resonant springs of Equation (2), and results in a lower natural frequency.

Particularly in view of the constraints on total device area (and consequently the proof mass 608), the reduced spring stiffness provides a lower natural frequency, which is approximately obtained using Rayleigh's method as expressed by:

$$f_n = \frac{1}{2\pi} \sqrt{\frac{k_x}{\left(m_p + \frac{12}{35}m_b + \frac{1}{4}m_t\right)}}, \quad (3)$$

where $m_p$, $m_b$, and $m_t$ are the mass of plate (kg), mass of beams (kg), and mass of trusses (kg), respectively.

The displacement resulting from the electrostatic force produced by an applied voltage and considering fringing field effects is approximately given by:

$$x = \alpha \frac{N\varepsilon_0 h V^2}{g_c k_x}, \quad (4)$$

where $\alpha$, $N$, $\varepsilon_0$, $V$, and $g_c$ are the fringing field constant, the total number of comb-drive fingers attached to the movable part of the resonator, the permittivity of air ($8.854 \times 10^{-12}$ F/m), the applied voltage (Volt), and the gap between the comb-drive fingers (m), respectively.

Alternatively, the maximum linear displacement can be calculated by dividing the mechanical force applied to the micro-structure by the spring constant. In this scenario, the maximum displacement of the low frequency resonator is mainly caused by the external source of vibration in terms of its magnitude and frequency, and the maximum displacement of the high frequency resonator is primarily determined by the mechanical forces exerted on it by the low frequency resonator. To limit the maximum displacement of the resonators, displacement limiting stops 620 are provided.

Based on the equations and the general device configuration described above, the design parameters of the high frequency resonator 800 and the three low frequency resonators 602, 604, 606 were optimised using the global optimisation method described in Ongkodjojo, and assuming that the resonators are made from silicon. The resulting optimised design parameters of the high frequency resonator 800 are summarised in Table 2.

TABLE 2

Design and optimisation results of the high frequency mechanical resonator with electrostatic micro-power generator for energy harvesting applications (an in-plane overlap varying electrostatic generator based on a comb-drive capacitor structure) by employing frequency-up conversion and self-tuning mechanism. The main objectives of the optimised design are: (1) to increase the applied voltage by maximising displacement and output power; and (2) to reduce the floor-map (footprint) area or device area significantly; (3) to reduce the natural frequency within the low frequency range; (4) and to provide a high number of comb-drive fingers to increase the device capacitance.

| Design No. | Variable | Description | Range |
|---|---|---|---|
| 1 | $l_b$ | Beam length | 300-500 µm |
| 2 | $w_b$ | Beam width | 2-3.5 µm |
| 3 | $l_c$ | Length of comb-drive finger | 75-100 µm |
| 4 | N | Number of comb-drive fingers (one part only) | 0-15 |
| | | Design Constants | |
| 1 | h | Structural thickness | 40 µm |
| 2 | $w_c$ | Width of comb-drive finger | 2 µm |
| 3 | $g_a$ | Suspension height | 4 µm |
| 4 | $g_c$ | Gap of comb-drive fingers | 2 µm |
| 5 | $l_{c\text{-}overlap}$ | Initial overlapping length of the comb-drive finger | $l_c/2$ |
| | | Material Constants (Silicon) | |
| 1 | E | Young's modulus | 160 GPa |
| 2 | P | Density | 2330 kg/m³ |
| 3 | v | Poisson ratio | 0.23 |
| 4 | $\varepsilon_r$ | Relative permittivity of air | 1 |
| 5 | $\varepsilon_0$ | Absolute permittivity of air | $8.854 \times 10^{-12}$ F/m |
| | | Design Constraints | |
| 1 | $f_n$ | Natural frequency of the micro-generator | ≤3.0 kHz |
| 2 | A | Total area including proof mass, beams, comb-drive fingers, trusses, fixed parts, anchors, and bond pad (including floor-plan area) | ≤4 mm² |
| 3 | Vol | Total volume | ≤1 mm³ |
| 4 | $Q_x$ | Lateral quality factor | ≥5 |
| | | Objective Function | |
| | $P_{out}$ | Output power | ≥40 µW |
| | | Global Optimisation Results | |
| 1 | $l_b$ | Beam length | 300 µm |
| 2 | $w_b$ | Beam width | 3.5 µm |
| 3 | $l_c$ | Length of comb-drive finger | 75 µm |
| 4 | $w_c$ | Width of comb-drive finger | 2 µm |
| 5 | N | Number of comb-drive fingers (one part only) | 15 |
| 6 | $N_{total}$ | Total number of comb-drive fingers (4 parts) | 60 |
| 7 | $x_o$ | Initial overlapping fingers displacement | 37.5 µm |
| 8 | $f_n$ | Natural frequency | 2.94 kHz |
| 9 | $A_{total}$ | Total area of the micro-generator | 2.17 mm² |
| 10 | $Vol_{total}$ | Total volume of the micro-generator | $8.66 \times 10^{-2}$ mm³ |
| 11 | $A_{floor}$ | Total floor-plan area | 3.86 mm² |
| 12 | $Vol_{floor}$ | Total volume of the floor-plan area | 0.15 mm³ |
| 13 | $m_{total}$ | Total mass of the micro-generator | 0.2 mg |
| 14 | Power | Maximum output power at resonance ($\omega_c = \omega/\omega_n = 1$) and at the maximum displacement | 47 µW |

*) The cavity can be under vacuum to improve the quality factor or damping of oscillations.

The optimised design parameters of the three low-frequency resonators, tuned to respective resonance frequencies, are summarised in Table 3.

TABLE 3

Design and optimisation results of the low frequency micro-resonators (micro-actuators) with respective serpentine beam configurations to provide specific respective tuning resonant frequencies within the ambient low frequency vibrations.

| Design No. | Variable | Description | Range |
|---|---|---|---|
| 1 | $l_b$ | Beam length | 50-750 µm |
| 2 | $l_m$ | Length of the movable mass | 100-1000 µm |
| 3 | $w_m$ | Width of the movable mass | 100-1000 µm |
| 4 | $N_b$ | Number of beams for forming the single serpentine beam | 2-20 |
| | | Design-Constants | |
| 1 | h | Structural thickness | 40 µm |
| 2 | $w_b$ | Beam width | 2 µm |
| 3 | $g_a$ | Suspension height | 4 µm |
| 4 | a | Meander length | (2 * beam_width + 10 µm) |
| | | Material Constants (Silicon) | |
| 1 | E | Young's modulus | 160 GPa |
| 2 | ρ | Density | 2,330 kg/m³ |
| 3 | v | Poisson ratio | 0.23 |
| 4 | $\varepsilon_r$ | Relative permittivity of air | 1 |
| 5 | $\varepsilon_0$ | Absolute permittivity of air | $8.854 \times 10^{-12}$ F/m |

TABLE 3-continued

Design and optimisation results of the low frequency micro-resonators (micro-actuators) with respective serpentine beam configurations to provide specific respective tuning resonant frequencies within the ambient low frequency vibrations.

| Design No. | Variable | Description | Range |
|---|---|---|---|
| | | Design Constraints | |
| 1 | $f_n$ | Natural frequency of the micro-generator | <400 Hz |
| 2 | A | Total area including proof mass, beams, fixed parts, anchors, and bond pads (including floor-plan area) | ≤1.5 mm² |
| 3 | Vol | Total volume | ≤1 mm³ |
| 4 | $Q_x$ | Lateral quality factor | ≥5 |
| | | Objective Function | |
| | $f_n$ | Natural frequency of the micro-generator | <400 Hz |
| | | Global Optimisation Results | |
| 1 | $l_b$ | Beam length | 400 μm |
| 2 | $w_b$ | Beam width | 2 μm |
| 3 | $l_m$ | Length of the movable mass | 550 μm |
| 4 | $w_m$ | Width of the movable mass | 550 μm |
| 5 | $N_b$ | Number of beams (number of turns) | 10 5 |
| 6 | $f_n$ | Natural frequency | 377.2 Hz |
| 7 | $A_{total}$ | Total area of the low frequency micro-resonator | 0.53 mm² |
| 8 | $Vol_{total}$ | Total volume of the low frequency micro-resonator | 2.10 × 10⁻² mm³ |
| 9 | $A_{floor}$ | Total floor-plan area | 0.79 mm² |
| 10 | $Vol_{floor}$ | Total volume of the floor-plan area | 3.15 × 10⁻² mm³ |
| 11 | $m_p$ | Proof mass | 2.82 × 10⁻² mg |
| 1 | $l_b$ | Beam length | 400 μm |
| 2 | $w_b$ | Beam width | 2 μm |
| 3 | $l_m$ | Length of the movable mass | 700 μm |
| 4 | $w_m$ | Width of the movable mass | 700 μm |
| 5 | $N_b$ | Number of beams (number of turns) | 10 (5) |
| 6 | $f_n$ | Natural frequency | 296 Hz |
| 7 | $A_{total}$ | Total area of the low frequency micro-resonator | 0.71 mm² |
| 8 | $Vol_{total}$ | Total volume of the low frequency micro-resonator | 2.85 × 10⁻² mm³ |
| 9 | $A_{floor}$ | Total floor-plan area | 1.11 mm² |
| 10 | $Vol_{floor}$ | Total volume of the floor-plan area | 4.42 × 10⁻² mm³ |
| 11 | $m_p$ | Proof mass | 4.57 × 10⁻² mg |
| 1 | $l_b$ | Beam length | 400 μm |
| 2 | $w_b$ | Beam width | 2 μm |
| 3 | $l_m$ | Length of the movable mass | 950 μm |
| 4 | $w_m$ | Width of the movable mass | 950 μm |
| 5 | $N_b$ | Number of beams (number of turns) | 10 (5) |
| 6 | $f_n$ | Natural frequency | 219.1 Hz |
| 7 | $A_{total}$ | Total area of the low frequency micro-resonator | 1.13 mm² |
| 8 | $Vol_{total}$ | Total volume of the low frequency micro-resonator | 4.50 × 10⁻² mm³ |
| 9 | $A_{floor}$ | Total floor-plan area | 1.74 mm² |
| 10 | $Vol_{floor}$ | Total volume of the floor-plan area | 6.95 × 10⁻² mm³ |
| 11 | $m_p$ | Proof mass | 8.41 × 10⁻² mg |
| 1 | $l_b$ | Beam length | 500 μm |
| 2 | $w_b$ | Beam width | 2 μm |
| 3 | $l_m$ | Length of the movable mass | 1000 μm |
| 4 | $w_m$ | Width of the movable mass | 1000 μm |
| 5 | $N_b$ | Number of beams (number of turns) | 12 (6) |
| 6 | $f_n$ | Natural frequency | 135.9 Hz |
| 7 | $A_{total}$ | Total area of the low frequency micro-resonator | 1.23 mm² |
| 8 | $Vol_{total}$ | Total volume of the low frequency micro-resonator | 4.93 × 10⁻² mm³ |
| 9 | $A_{floor}$ | Total floor-plan area | 1.93 mm² |
| 10 | $Vol_{floor}$ | Total volume of the floor-plan area | 7.71 × 10⁻² mm³ |
| 11 | $m_p$ | Proof mass | 9.32 × 10⁻² mg |
| 1 | $l_b$ | Beam length | 750 μm |
| 2 | $w_b$ | Beam width | 2 μm |
| 3 | $l_m$ | Length of the movable mass | 1000 μm |
| 4 | $w_m$ | Width of the movable mass | 1000 μm |
| 5 | $N_b$ | Number of beams (number of turns) | 20 (10) |
| 6 | $f_n$ | Natural frequency | 57.1 Hz |
| 7 | $A_{total}$ | Total area of the low frequency micro-resonator | 1.27 mm² |
| 8 | $Vol_{total}$ | Total volume of the low frequency micro-resonator | 5.10 × 10⁻² mm³ |
| 9 | $A_{floor}$ | Total floor-plan area | 2.12 mm² |
| 10 | $Vol_{floor}$ | Total volume of the floor-plan area | 8.48 × 10⁻² mm³ |
| 11 | $m_p$ | Proof mass | 9.32 × 10⁻² mg |

*) The cavity can be under vacuum to improve the quality factor or damping of oscillations.

Using the optimised design parameters given above, an optimised energy harvester can be manufactured. As described above, the harvester is most conveniently fabricated from a silicon-on-insulator (SOI) wafer and using a surface micromachining process based on the standard Bosch process known to those skilled in the art to form the resonator and capacitor structures from the silicon layer of the SOI wafer.

Figure 9:
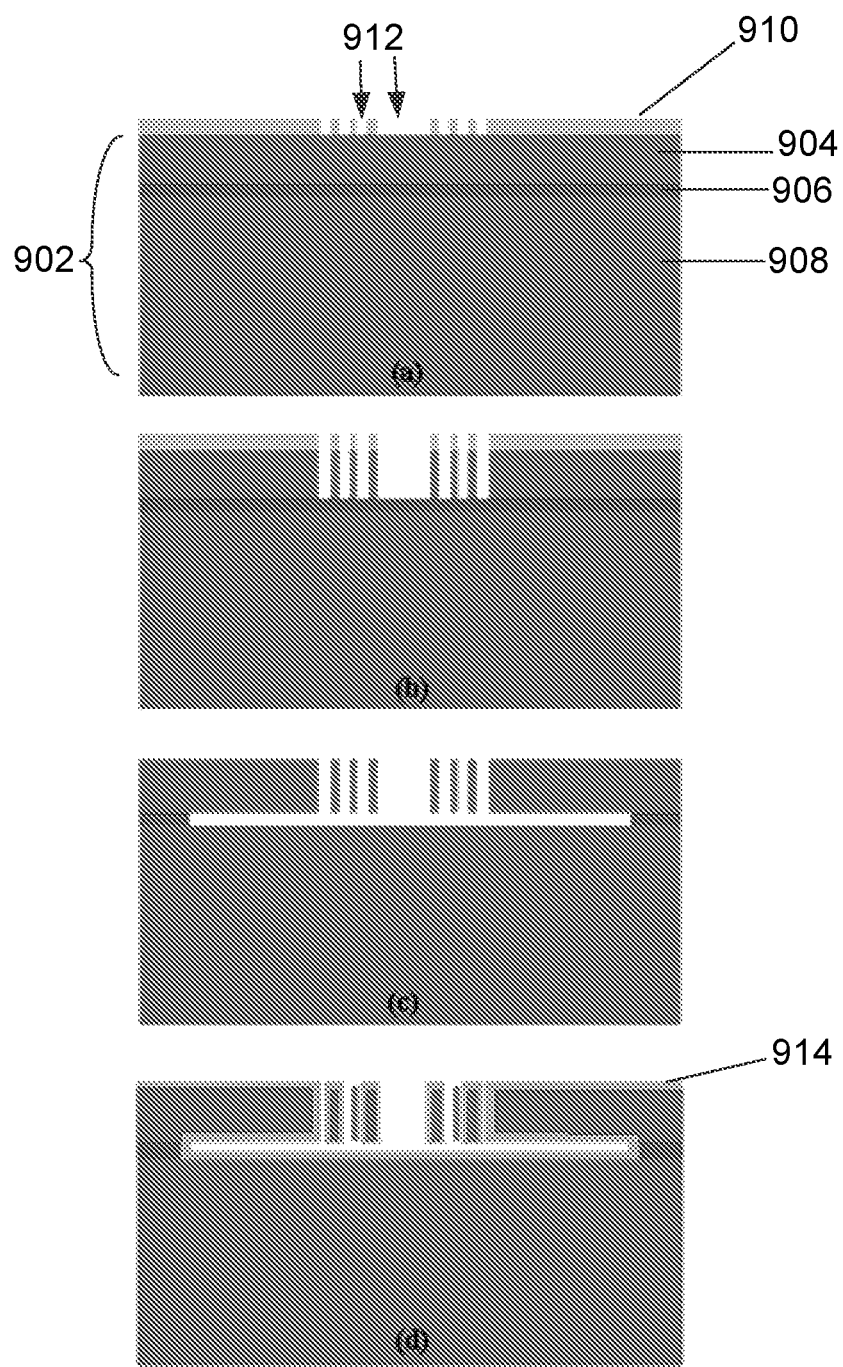
FIG. 9 is a set of successive schematic cross-sectional side views of an SOI (silicon-on-insulator) wafer (including additional deposited layers) during processing to fabricate the energy harvester of FIG. 6.

FIG. 9 is a set of schematic cross-sectional side views of an SOI wafer 902 (with additional deposited surface layers) during processing to form the energy harvester. The starting material is an SOI wafer 902 consisting of a 20 μm thick silicon layer (device layer) 904 disposed on a 4 μm thick buried SiO₂ layer 906 on a 350 μm silicon substrate or wafer 908. The silicon layer 904 and underlying wafer substrate 908 are both of <100> orientation and are n-type with a resistivity in the range of 0.001-0.005 Ohm-cm. After cleaning, standard photolithography is used to form a patterned layer of photoresist 910 on the silicon layer 904, as shown in FIG. 9(a). In the described embodiments, the layer of photoresist 910 has a thickness of at least ~1.5 μm to protect the underlying silicon layer 904 during the subsequent etching process.

Figure 10:
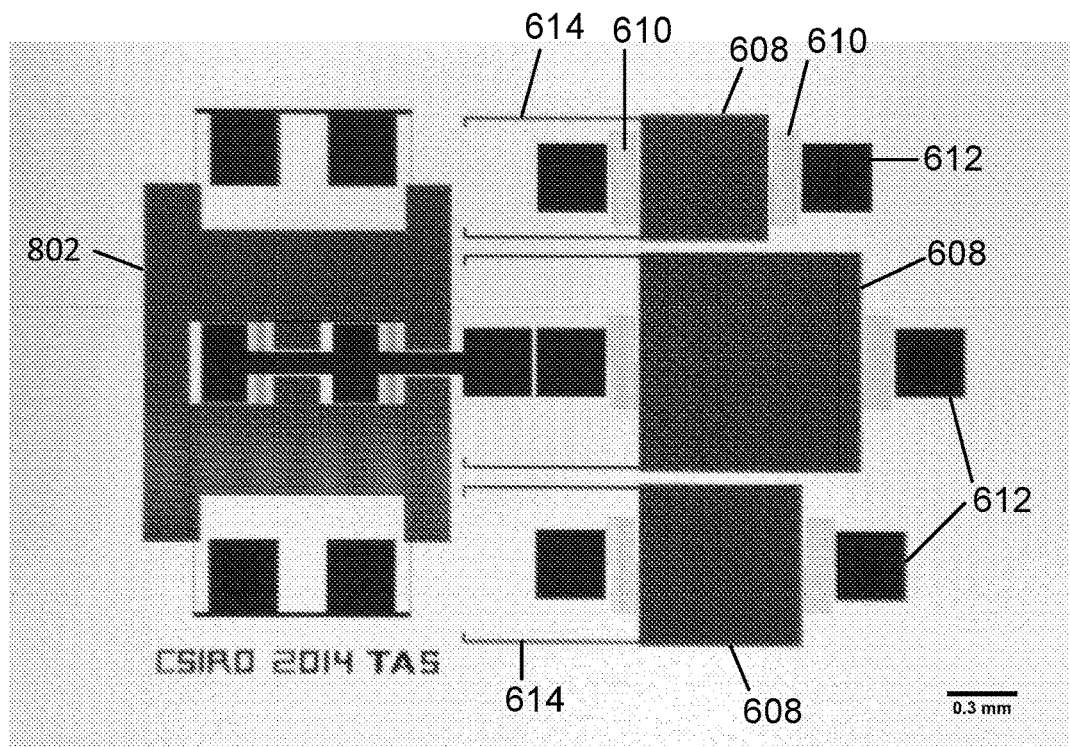
FIG. 10 is an image of a photomask used to manufacture the lateral resonator structures shown in FIG. 6.

As the optimised design parameters shown in Tables 2 and 3 include a silicon layer thickness of 40 μm, the parameters were correctly adjusted to account for the use of a thinner 20 μm thick silicon layer in the manufactured energy harvesting assemblies. FIG. 10 is an image of a chrome photomask designed using the optimised parameters. This photomask is used to pattern the photoresist layer 910 which is then used as an etch mask to enable etching of selected areas of the silicon layer 904 in order to form the resonator and capacitor structures described above.

A Deep Reactive Ion Etching (DRIE) process is used to etch the exposed regions of the silicon layer 904 through to the underlying oxide layer 906, as shown in FIG. 9(b). The resulting micro-machined structures (i.e., the proof masses 608, 802 and corresponding springs) are then partially released by removing corresponding portions of the underlying oxide 906 with HF (hydrofluoric acid), resulting in the structures shown in FIG. 9(c). As will be appreciated by those skilled in the art, etch holes formed in the proof masses 608, 802 facilitate access of the HF etchant to the oxide layer under the silicon layer in order to release the proof masses 608, 802 from the silicon substrate 908. Finally, a thin film of an electret material (in this case, a 0.1 μm layer of SiO₂) 914 is formed on the structures using a standard process such as chemical vapour deposition (CVD), plasma-enhanced chemical vapour deposition (PECVD), low-pressure chemical vapour deposition (LPCVD), thermal growth, RF sputtering, or spin coating, for example. In the described embodiments, the electret material 914 is $SiO_2$. However, it will be apparent to those skilled in the art that in other embodiments other electret materials can be alternatively used, including materials such as paralyne-C and high-performance perfluorinated polymer electret CYTOP to provide better electrical properties.

In any case, the electret material 914 needs to be electrostatically charged. In the described embodiments, the electret material 914 is charged using the soft x-ray charging process described in Q. Fu and Y. Suzuki, "*MEMS Vibration Electret Energy Harvester with Combined Electrodes*", *IEEE Proc. MEMS* 2014, San Francisco, USA, pp. 409-412. However, it will be apparent to those in the art that alternative charging methods can be used in other embodiments, including corona charging, for example.

Figure 11:
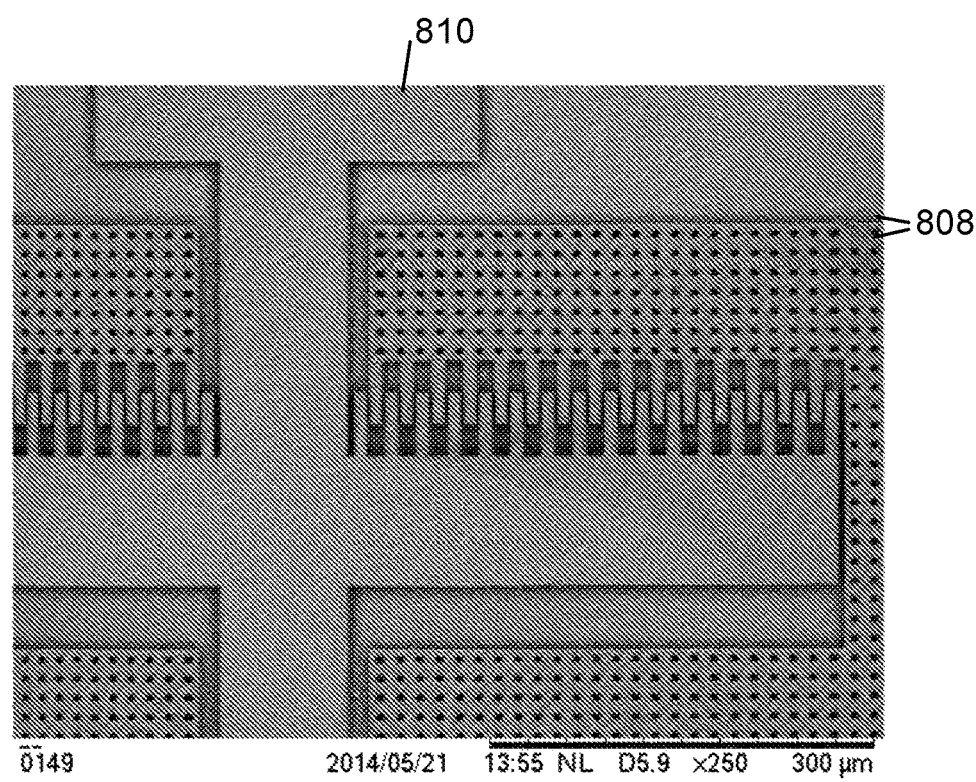
FIG. 11 is a scanning electron microscope (SEM) image of a portion of a manufactured instance of the high frequency lateral resonator of FIG. 8, showing details of one of the interdigitated finger electrodes that form a variable capacitor of the high frequency lateral resonator.
Figure 12:
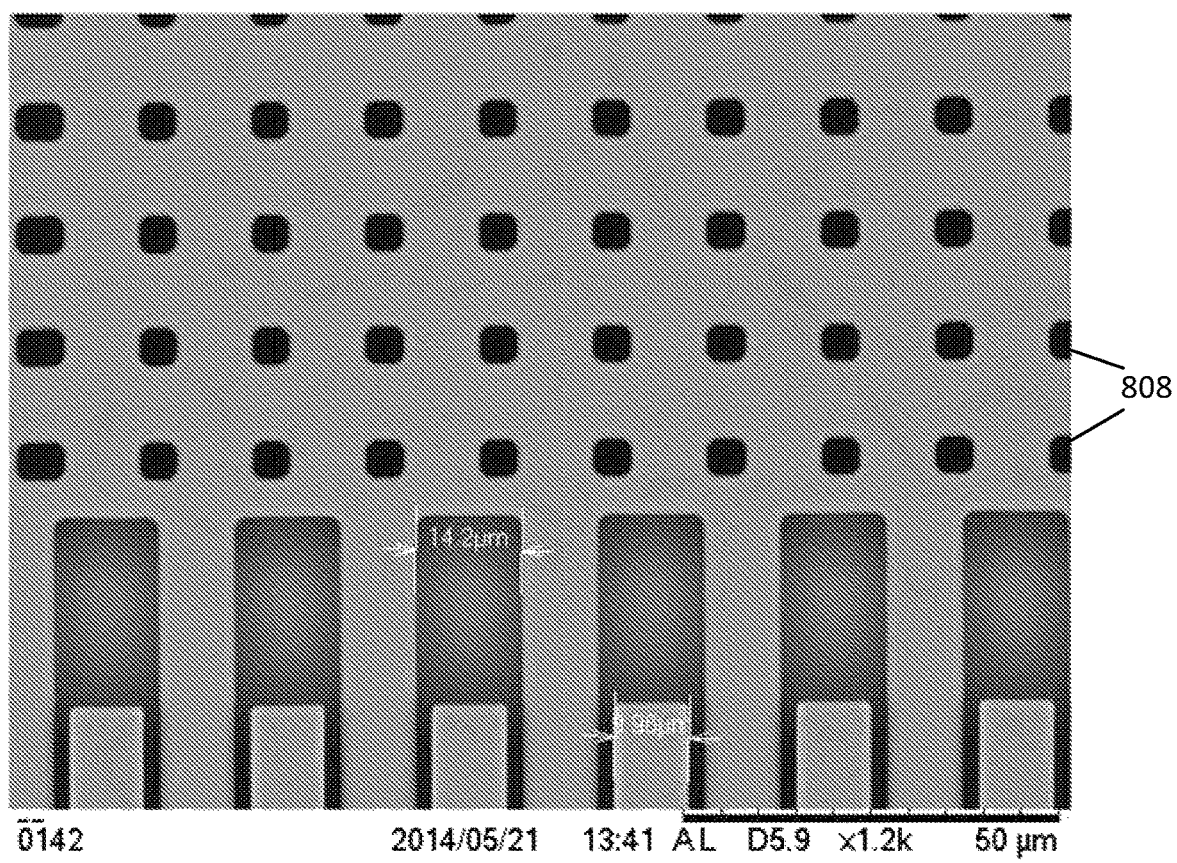
FIG. 12 is a scanning electron microscope image showing a higher magnification view of the interdigitated finger electrodes and the ~2 μm lateral clearance therebetween.

FIG. 11 is a scanning electron microscope (SEM) image showing one of the four sets of variable capacitors 806 of the high frequency resonator 800, and FIG. 12 is a higher magnification scanning electron microscope image showing the close spacing of the interdigitated finger electrodes of the variable capacitors 806. In this embodiment, the width of each projecting finger electrode is measured to be 9.96 µm, and the receiving channels 14.2 µm, so that the gaps between these features are only 2 µm wide. In another embodiment (not shown), the width of each projecting finger electrode is only 2 µm wide, with the same 2 µm wide gaps on either side to the edges of the corresponding 6 µm wide receiving channel.

Figure 8:
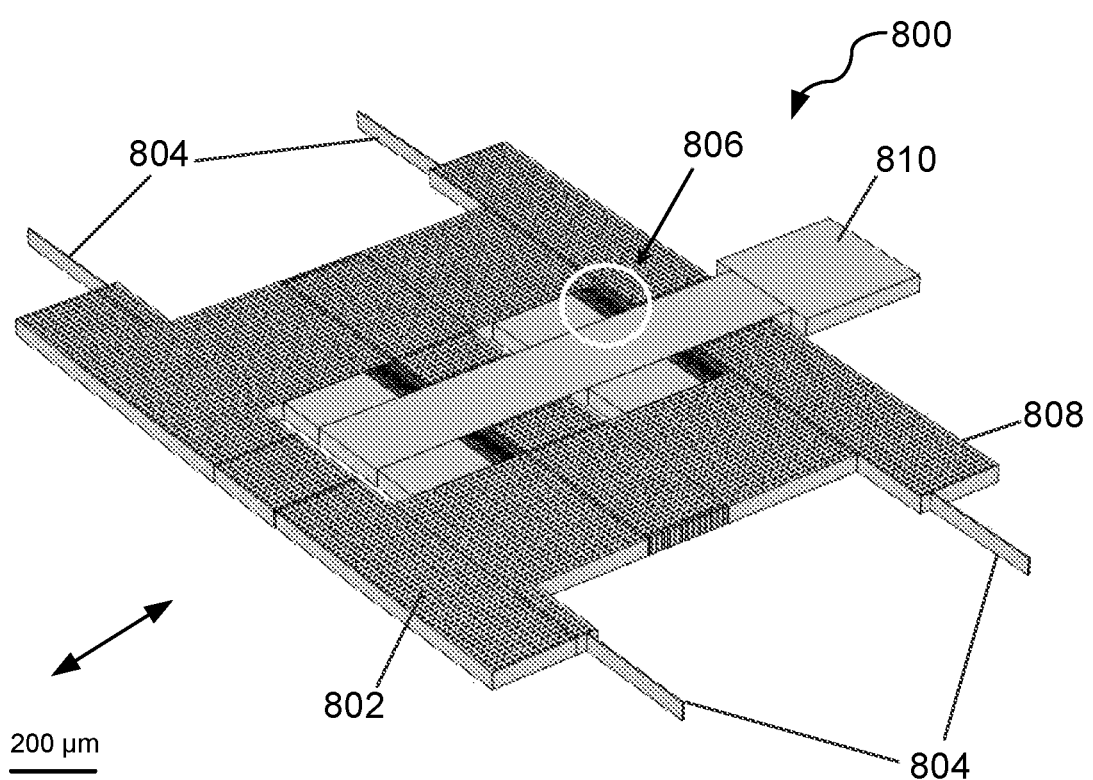
FIG. 8 shows a computer-generated model of the high frequency lateral resonator of FIG. 6, showing details of the elongate springs supporting the resonator proof mass.

The in-plane lateral oscillations of the proof mass 802 increase and decrease the degree of overlap between each pair of electrodes, correspondingly increasing and decreasing the capacitance therebetween, which corresponds to the capacitance between the comb-drive fingers 806 attached to the proof mass 802 and the comb-drive fingers 806 attached to the fixed parts 810 of the high frequency resonator structure 800, as shown in FIG. 8.

Because the variable capacitors are integral components of the high frequency resonator 800, it is possible to operate the high frequency resonators in reverse by applying a voltage to the variable capacitors and measuring the resulting lateral oscillations of the high frequency resonator 800. Accordingly, an AC sine wave voltage having a peak amplitude of 21 V with no DC offset was applied to the variable capacitors of the high frequency resonator shown in FIG. 11, and the resulting lateral oscillations were captured and analysed using a SUSS MicroTec PM 5 probe system. The high-frequency lateral resonator structure 800 was measured to have a fundamental resonance at an applied AC signal frequency of 974 Hz, equal to half the natural resonance frequency of 1.976 kHz, due to pure AC voltage actuation (as described in W. C-K. Tang, "Electrostatic comb-drive for resonant sensor and actuator applications", Ph.D Thesis University of California, Berkeley, 1990 ("Tang")).

Table 4 summarises the resulting measured resonant frequencies and the analytical model predictions, showing good agreement between the experimental and analytical results.

The natural frequency of the high frequency resonator 800 is 2.14 kHz based on the analytical result, the natural frequency being the resonant frequency in the absence of an applied voltage. However, the resonant frequency will decrease with increasing applied voltage, as shown in Table 4, an effect known to those skilled in the art as the "spring softening effect". Consequently, the measured resonant frequency is always lower than the theoretical natural frequency.

TABLE 4

The resonant frequencies of the high frequency resonator 800: analytical model results and experimental results

|  | Analytical Model (kHz) | Measurement (Hz or kHz) | Error (%) |
|---|---|---|---|
| The 1$^{st}$ resonant frequency | 1.07*) | 974 | 9.9 |
| The 2$^{nd}$ resonant frequency | 2.14 | 1.976 | 8.3 |

*)The first resonant frequency of the high frequency resonator 800 was calculated by dividing the natural frequency of the device by two ($f_{res} = f_n/2$, $f_n = 2.14$ kHz) according to the frequency doubling effect described in Tang. The high frequency resonator 800 has a natural frequency of 1.976 kHz without any applied voltage; and it has another resonant frequency of 974 Hz that is half the natural frequency due to the applied AC driving signal (doubling-frequency effect).

Figure 13:
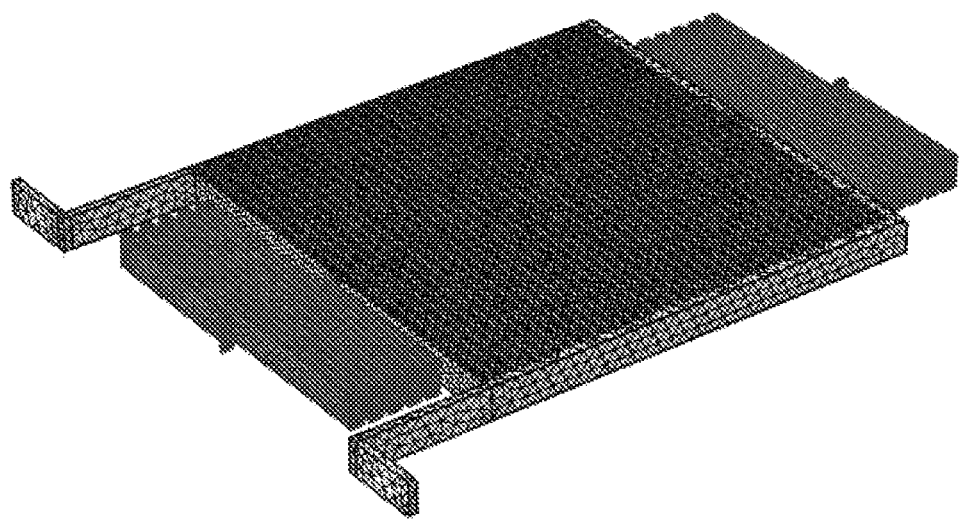
FIG. 13 is a computer-generated image showing a meshed three-dimensional finite element analysis (FEA) model of the low-frequency structure of FIG. 7.
Figure 14:
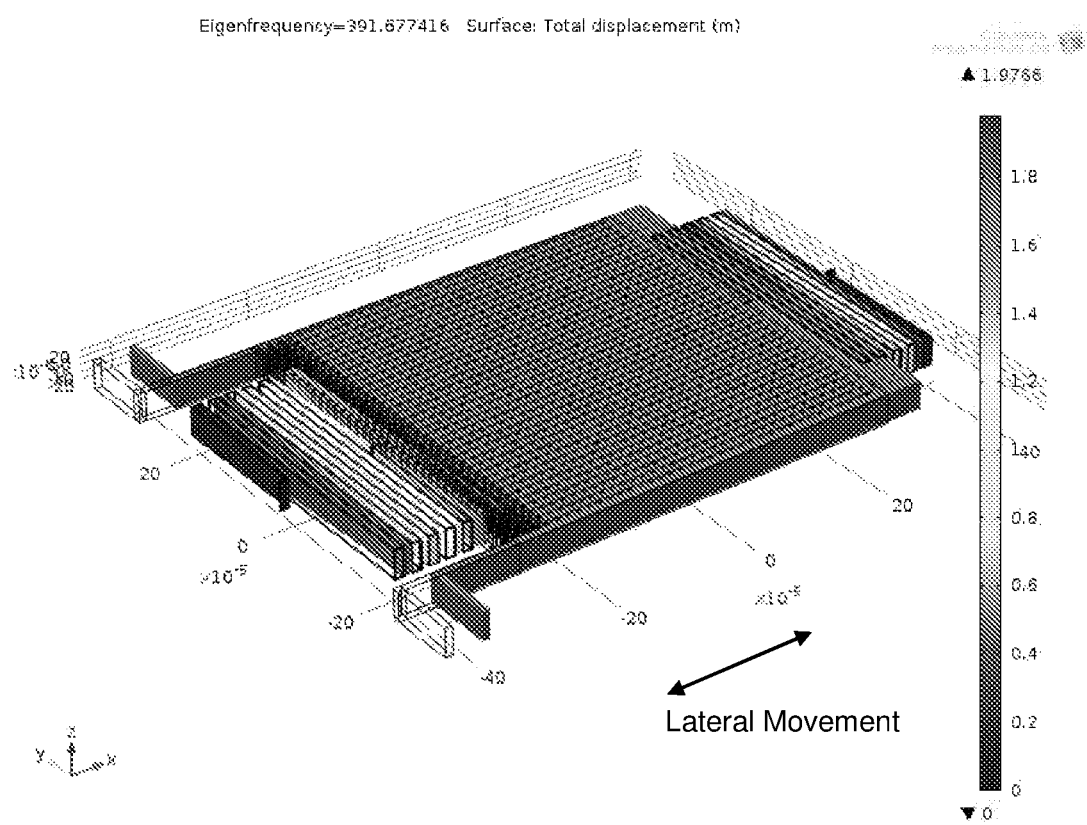
FIG. 14 is a computer-generated image showing the fundamental resonant mode of the low-frequency structure of FIGS. 7 and 13, at a frequency of 391.7 Hz.
Figure 15:
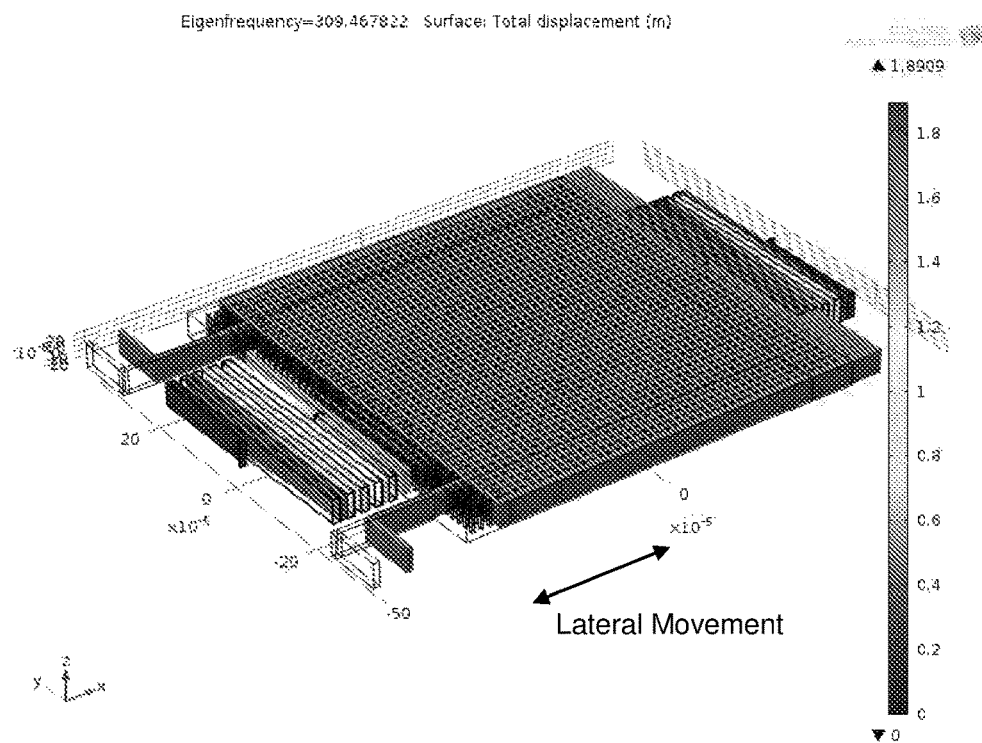
FIG. 15 is a computer-generated image showing the fundamental resonant mode of the second low-frequency structure, at a frequency of 309.5 Hz.
Figure 16:
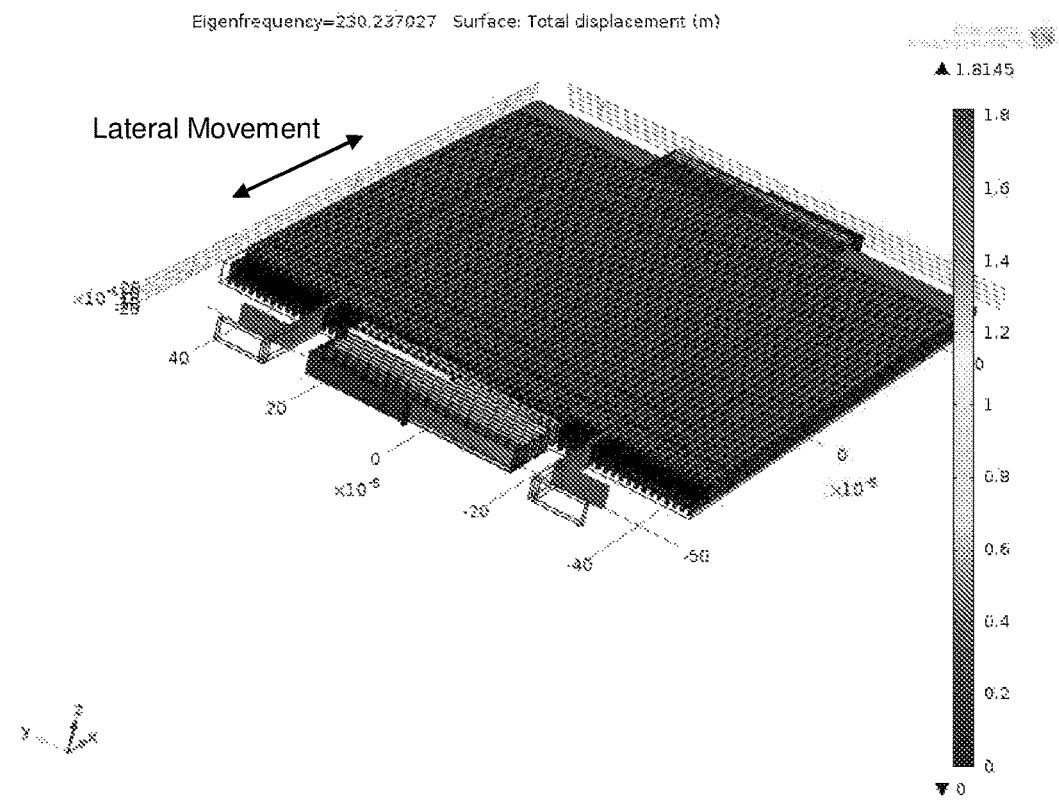
FIG. 16 is a computer-generated image showing the fundamental resonant mode of the third low-frequency structure, at a frequency of 230.2 Hz.

With regard to the three low frequency resonators 602, 604, 606, their lateral oscillation behaviour can be simulated using standard finite element analysis (FEA) software such as ANSYS or COMSOL Multiphysics™, for example. FIG. 13 is a computer-generated image of a meshed model of the first low frequency resonator, and FIGS. 14, 15, and 16 show the simulated behaviour of the three resonators at their lowest frequency resonances, as calculated by the modal analysis (eigenfrequency or eigenvalue solver) of the COMSOL Multiphysics™ FEA software package. The meshed model of FIG. 13 consists of 154,435 tetrahedral elements for a structural thickness of 20 µm, with higher meshing for the beams (using fine meshing), and normal meshing for the others.

The first three resonant modes of the first low frequency resonator shown in FIG. 14 are calculated to occur at frequencies of 391.7 Hz, 1,281.6 Hz and 1,427.6 Hz, respectively, using a 3D meshed model consisting of 154,435 tetrahedral elements and 84,236 triangular elements.

The first three resonant modes of the second low frequency resonator shown in FIG. 15 are calculated to occur at frequencies of 309.5 Hz, 1,025.8 Hz and 1,129.9 Hz, respectively, using a 3D meshed model consisting of 202,979 tetrahedral elements and 108,846 triangular elements.

Finally, FIG. 16 shows the first resonant mode of the third low frequency resonator at a frequency of 230.2 Hz, calculated using a model consisting of 455,085 tetrahedral elements and 197,935 triangular elements.

Table 5 summarises the natural or lowest resonant frequency of each of the three resonator structures, as calculated by FEA as described above and analytically, demonstrating that these two different calculation methods are in good agreement, differing by less than 5% in each case.

TABLE 5

The resonant frequency comparison between analytical model results and FEA results for the three low frequency lateral resonators.

|  | Analytical Model Results (Hz) | FEA Results (Hz) | Error (%) |
|---|---|---|---|
| Natural frequency of the 1$^{st}$ microresonator (FIG. 14) | 377.2 | 391.7 | 3.70 |
| Natural frequency of the 2$^{nd}$ microresonator (FIG. 15) | 297 | 309.5 | 4.0 |
| Natural frequency of the 3$^{rd}$ microresonator (FIG. 16) | 219.1 | 230.2 | 4.8 |

Displacement vs Applied Voltage

Figure 17:
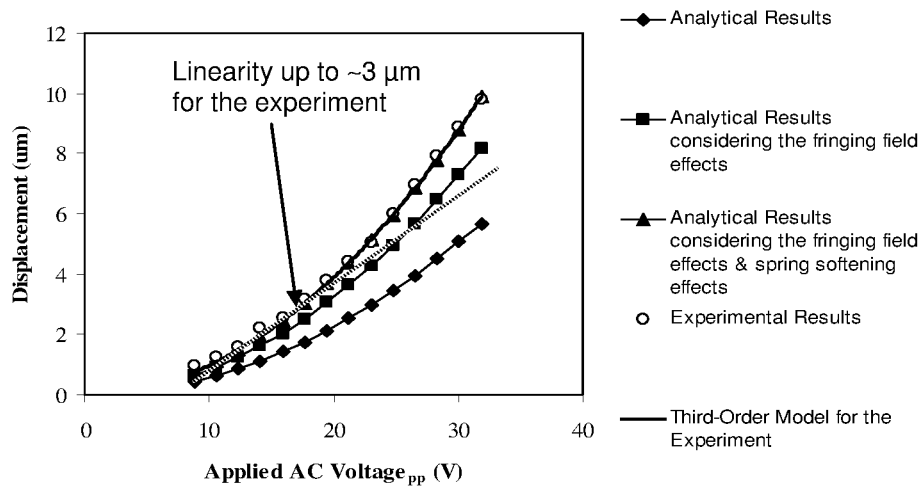
FIGS. 17 and 18 are graphs of the lateral displacement of the high frequency lateral resonator as a function of the peak-to-peak (pp) alternating current (AC) voltage applied across its interdigitated finger electrodes, as simulated using various methods and as measured experimentally, at measured resonant frequencies of 974 Hz and 1.976 kHz, respectively (being half of the fundamental and natural resonant frequencies of the structure due to the frequency doubling effect)

FIG. 17 is a graph of the lateral displacement of the high frequency resonator 800 as a function of the amplitude of the AC voltage applied to its variable capacitors, at its measured resonant lateral oscillation frequency of 974 Hz, the lateral displacement being as measured and as calculated analytically, taking into account fringing fields and spring softening effects.

The measurements demonstrate lateral displacements up to 9.8 µm resulting from applied voltage amplitudes up to 32 V under these conditions.

These displacements have a linear dependence on applied voltage amplitude up to a displacement of ~3 µm, which is approximately up to 10% of the length of the supporting beams 804. FIG. 17 also shows that there is good agreement between the experimental results and the analytical results. However, there are some differences. In particular, it is noted that the measurement results are higher, when compared with the analytical results, particularly at higher applied voltages, due to spring softening effects (the negative spring constant) as described above. It is considered that the differences between the experimental results and the analytical results are mainly due to these spring softening effects, geometric mismatch between the intended design and the actual dimensions of the fabricated structure, signal noise, and the measurement accuracy.

Figure 18:
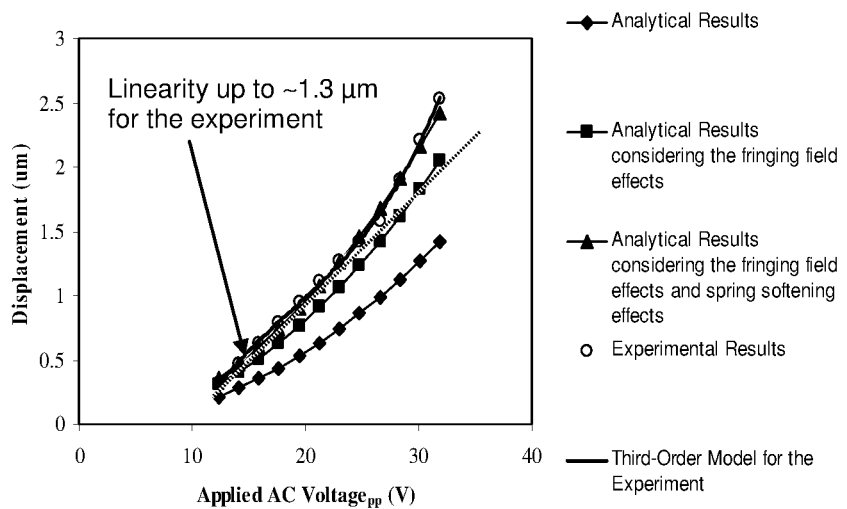

Moreover, spring softening causes the lateral displacements to be greater at lower resonance frequencies than at higher resonance frequencies. FIG. 18 is a graph similar to that of FIG. 17, but at the second resonant mode at a frequency of 1.97 kHz (compared with 974 Hz for FIG. 17). Because the spring softening effects are more significant for the lower resonant frequency, the measured displacement results at the higher resonant frequency of 1.976 kHz, which is approximately the same as the natural frequency of the high frequency lateral resonator, are overall more accurate than those for the lower resonant frequency of 974 Hz.

This higher resonance frequency also produces smaller lateral displacements for the same applied voltages as clearly shown by comparing FIGS. 17 and 18. In FIG. 18, lateral displacements up to 2.5 µm were measured for applied voltage amplitudes up to 32 V, with a linear dependence for lateral displacements up to ~1.3 µm.

When the fringing field effects and the spring softening effects are not considered for the analytical model, the discrepancies among them are significant, as shown in FIGS. 17 and 18. However, the differences are substantially reduced if fringing field effects are included in the analytical models. Moreover, excellent agreement is achieved when both fringing field effects and spring softening effects are included in the analytical models of the structure.

Figure 19:
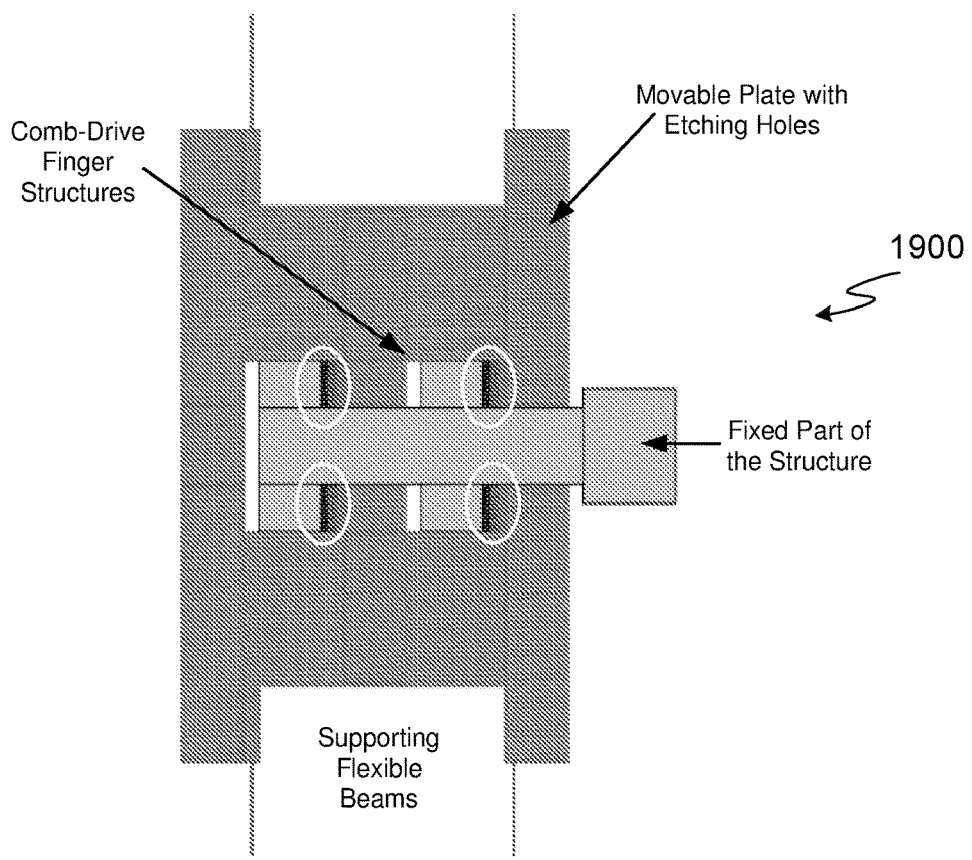
FIG. 19 is a plan view image of a three-dimensional solid model of the high frequency lateral resonator used for FEA simulations.

FIG. 19 shows a second high frequency micro-resonator 1900 having a higher fundamental resonance frequency than the high frequency micro-resonator 800 described above, and consequently providing higher output power.

Figure 20:
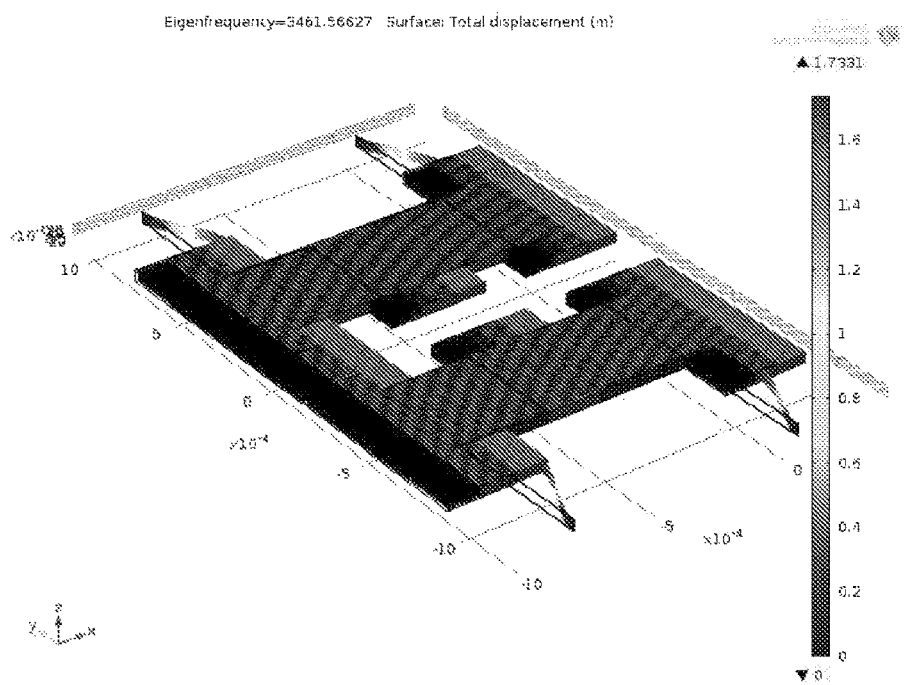
FIG. 20 is a computer-generated image showing the first lateral resonant mode of the high-frequency structure, at a frequency of 3.46 kHz.

FIG. 20 shows the meshed model of the second high frequency lateral resonator 1900, consisting of 740,381 domain elements, 332,576 boundary elements, and 153,090 edge elements at its (first mode) resonant frequency of 3.46 kHz, as calculated by FEA. Its higher frequency modes are calculated to be 18.2 kHz and 28.5 kHz.

Estimated Power Output

The energy harvesting devices described herein convert kinetic energy into electrical energy by corresponding variations in the spacing of charged capacitor plates. The capacitance of the MEMS variable capacitor at a given time is determined by the displacement z(t) of the proof mass of the high frequency resonator relative to the housing, which is indirectly caused by the input vibration signal y(t). The resulting displacement and its natural frequency can be measured to estimate an equivalent amount of power based on electrostatic approximations according to Equation (1).

Based on the measured and calculated behaviours of the lateral resonators described above, the output power of the energy harvester 1900 is estimated to be approximately 39 nW (using a displacement of 9.8 µm due to the electrostatic force, a resonant frequency of 974 Hz (equivalent to $6.1198 \times 10^3$ rad/s), a source motion amplitude of 3.3 µm, and a proof mass of $1.049 \times 10^{-8}$ kg). The maximum power is estimated to be approximately 99 nW. It should be noted that the estimated output power is also a function of the source vibration amplitude (see Eq. (1)). When the source motion amplitude is 0.1 µm, a maximum power of approximately 1.2 nW can be obtained.

Furthermore, for fixed lateral dimensions (i.e., using a given photomask), the output power depends upon the (vertical) thickness of the structures, or equivalently their aspect ratio. For example, using the lateral dimensions of the structures described above, the maximum power output is estimated to be approximately 0.15 mW for an aspect ratio of 100 at a resonant frequency of approximately 2.9 kHz, a high frequency resonator maximum displacement of 25 µm, and a source motion amplitude of 3.3 µm due to the external vibrations. Thus, this power estimation is also dependent of the aspect ratio of the micro-structure, assuming the same lateral dimensions of the various microstructures. For example, a power output of approximately 47 µW is estimated for an aspect ratio of 20.

Figure 21:
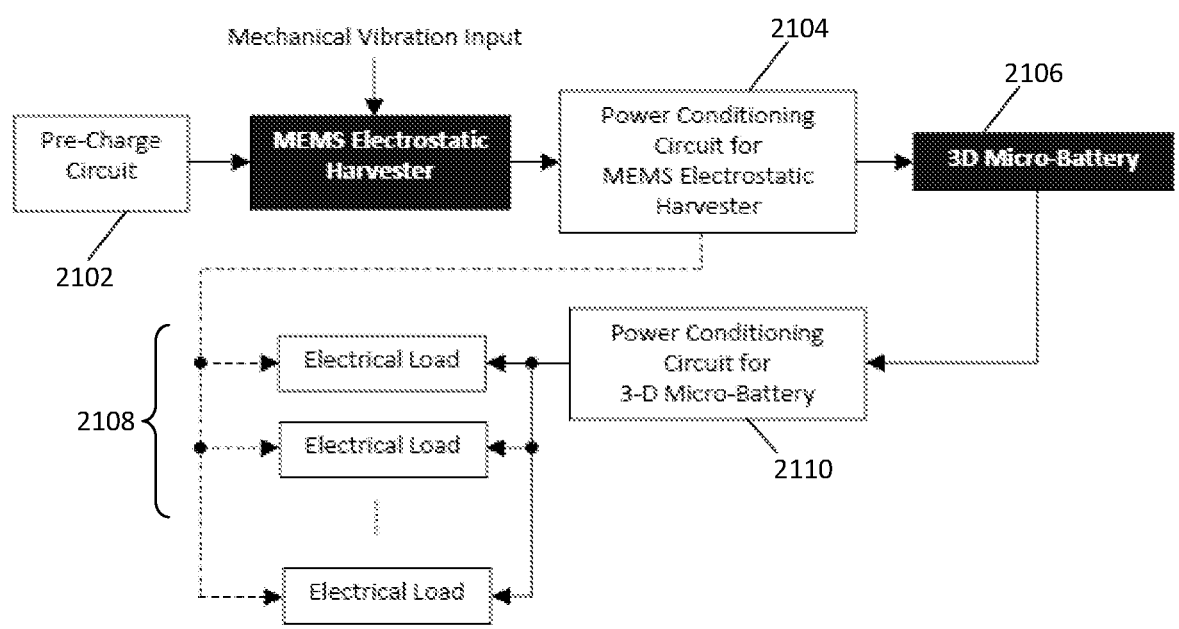
FIG. 21 is a block diagram illustrating a typical application of the described energy harvesting devices to power one or more electrical loads (typically including one or more environmental sensors, a wireless transmitter, and other microelectronic components)

Finally, FIG. 21 is a block diagram illustrating a typical application for the energy harvesting assemblies or devices described herein. Due to the use of electrostatic transduction, a pre-charge circuit 2102 is used to maintain a static charge on the capacitor plates of the high frequency resonator of an energy harvesting device. When subjected to external mechanical vibrations, the low frequency resonators are excited into lateral oscillation modes, and thus convert a portion of this vibration energy into kinetic energy. A portion of this kinetic energy is effectively up-converted by using it to drive lateral oscillations of the high frequency resonator.

The electrostatic transducer elements of the high frequency resonator convert the resulting kinetic energy of the high frequency resonator into electrical energy via the changing overlap between the plates of the variable capacitors. The resulting electrical output from the energy harvesting device is provided to a first power conditioning circuit that in turn provides electrical power to a storage battery 2106 or to one or more electrical loads 2108. Where the latter are powered by the storage battery 2106, this is via a second power conditioning circuit 2110 as described in E. O. Torres and G. A. Rincon-Mora, "Electrostatic Energy Harvester and Li-Ion Charger Circuit for Micro-Scale Applications", *Proc. 49th IEEE International Midwest Symposium on Circuits ad Systems*, 2006 (*MWSCAS'06*), USA, pp. 65-69; in T. Pichonat, C. Lethien, D. Hourlier, N. Tiercelin, D. Troadec, and P. A. Rolland, "Towards the 3-D Microfabrication and Integration of a Complete Power Unit Used for Energy Autonomous Wireless System", *ECS* (*Electrochemical Society*) *Transactions*, Vol. 25, No. 35, pp. 11-21, 2010; and in A. Tabesh and L. G. Frechette, "A Low-Power Stand-Alone Adaptive Circuit for Harvesting Energy From a Piezoelectric Micropower Generator", *IEEE Transactions on Industrial Electronics*, Vol. 56, No. 3, pp. 840-849, 2010.

When compared with prior art energy harvesting structures, the energy harvesting devices and structures described herein are able to generate a relatively high output power from vibration frequencies below approximately 400 Hz, whilst having a small physical footprint and volume. Where multiple low frequency resonators are used, the fundamental resonance frequencies of these resonators can be tuned to match vibration frequencies of interest.

Finally, it will be apparent to those skilled in the art that although the embodiments of the present invention have been described herein in terms of energy harvesting, they can also or alternatively be used for other purposes, such as for measuring or otherwise characterising mechanical vibrations, for example. For example, an electromechanical transducer as described herein can be used as a sensor to generate an output signal representative of ambient vibrations (as opposed to providing a source of energy).

EXAMPLE

Figure 22:
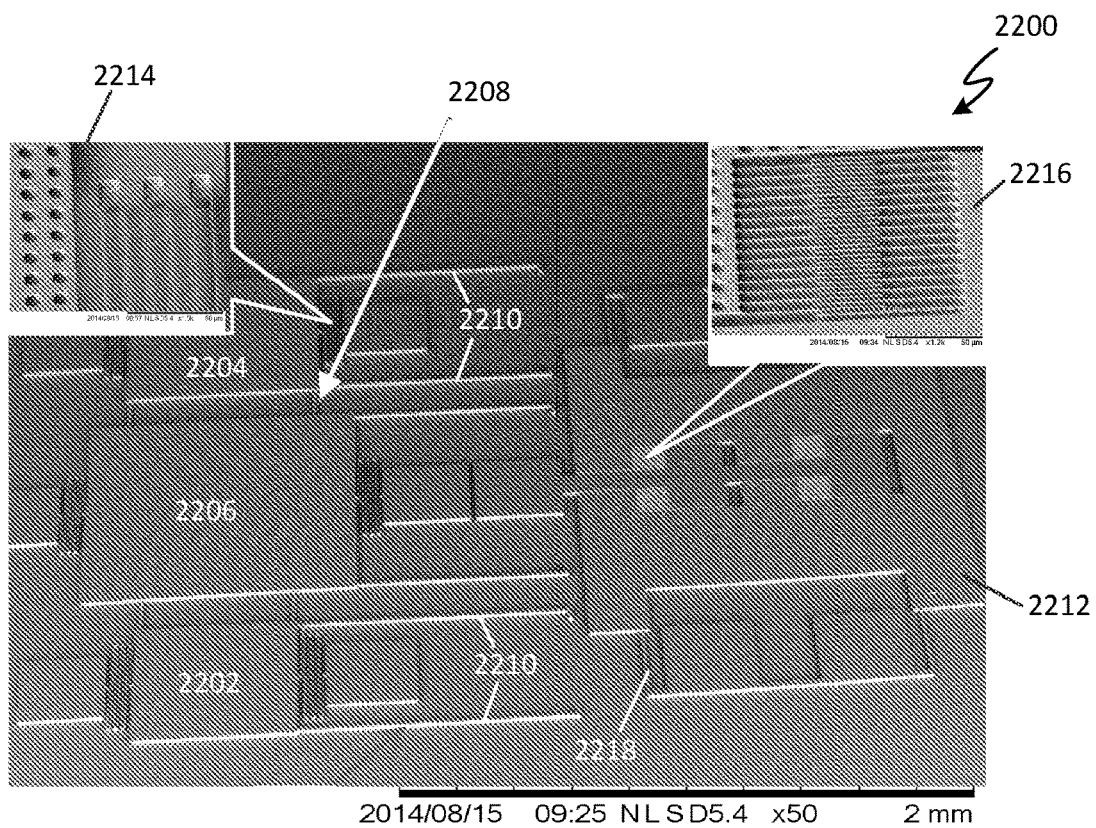
FIG. 22 is a scanning electron microscope image of a microfabricated energy harvester assembly in accordance with an embodiment of the present invention, and including three mutually coupled low-frequency mechanical resonators having respective different resonance frequencies to drive a corresponding high-frequency mechanical resonator having variable capacitors to generate electrical energy from mechanical vibrations.

In order to demonstrate the utility of the energy harvesting assemblies described above, a wafer of energy harvesting assemblies of the general form shown in FIG. 5 were manufactured using the processes described above. FIG. 22 is a scanning electron microscope image of one of the energy harvesting assemblies, showing the three low frequency mechanical resonator structures 2202, 2204, 2206 with respective different fundamental resonant frequencies, and mutually coupled by intermediate coupling springs 2208. Each of the three low frequency mechanical resonator structures 2202, 2204, 2206 has a corresponding pair of drive arms 2210 extending towards the nearby high frequency mechanical resonator structure 2212. The overall footprint of the energy harvesting assembly 2200 is 3.4 mm×2.5 mm and the thickness of the resonator structures 2202, 2204, 2206, 2212 is ~20 µm.

The inset image 2214 in the top left corner of FIG. 22 shows an enlarged view of one of the serpentine springs of the second low frequency mechanical resonator structure 2204, while the inset image 2216 in the top right corner of FIG. 22 shows an enlarged view of one of the sets of interdigitated finger electrodes or 'comb drives' of the high frequency mechanical resonator structure 2212.

Figure 23:
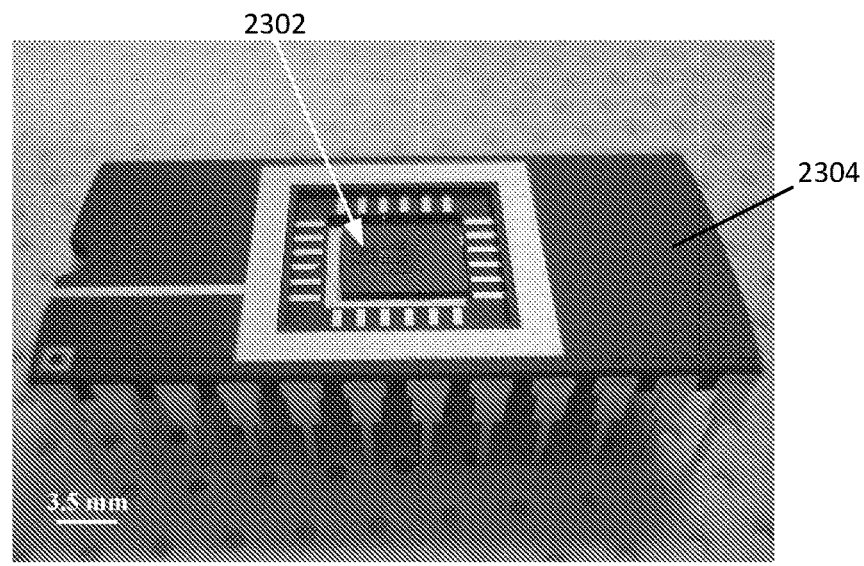
FIG. 23 is a photograph of a singulated die including an energy harvester assembly mounted in a ceramic package, and including wire bonded electrical connections between the energy harvester assembly and connection pins of the ceramic package.

The wafer was diced to provide individual dies, each including a corresponding energy harvesting assembly, and each singulated die 2302 was mounted in a corresponding ceramic package 2304, as shown in FIG. 23. Wire bonding was used to make electrical connections from the comb drive electrodes to corresponding pins of the ceramic package 2304. Each package 2304 was subsequently sealed to protect the energy harvesting assemblies from dust and other forms of contamination.

The primary objectives of the measurements described below were to determine the fundamental frequency of each resonator of the energy harvesting assemblies, and to test the performance of the energy harvesting assemblies as electrostatic micro-generators.

Two methods were used to excite the MEMS devices into oscillatory motion: electrical stimulation, and direct mechanical stimulation.

Figure 24:
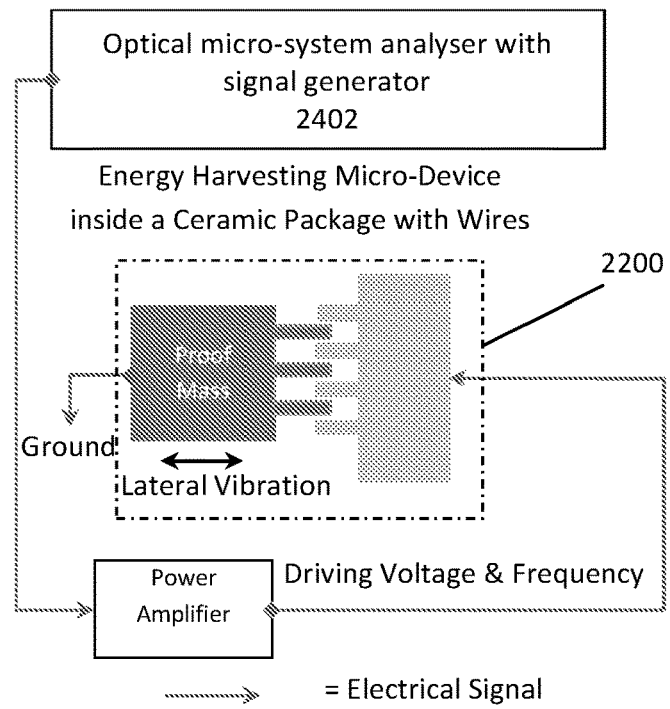
FIG. 24 is a block diagram of a testing apparatus configured to use an electrical drive signal to drive oscillations of the high-frequency mechanical resonator of FIG. 22 while capturing images of its oscillatory motion using stroboscopic imaging and a micro-system analyser.

In one test apparatus, as shown in FIG. 24, a laser vibrometer with stroboscopic imaging and a built-in signal generator (a Polytec MSA-400, Micro-Systems Analyzer) 2402 was used to generate electrical signals that were applied to the electrodes of the high frequency resonator structure 2212, and to measure the resulting mechanical behaviour of the high frequency resonator structure 2212 by stroboscopic optical imaging. The resulting images were recorded and processed to generate Bode plots of the corresponding frequency response.

Figure 25:
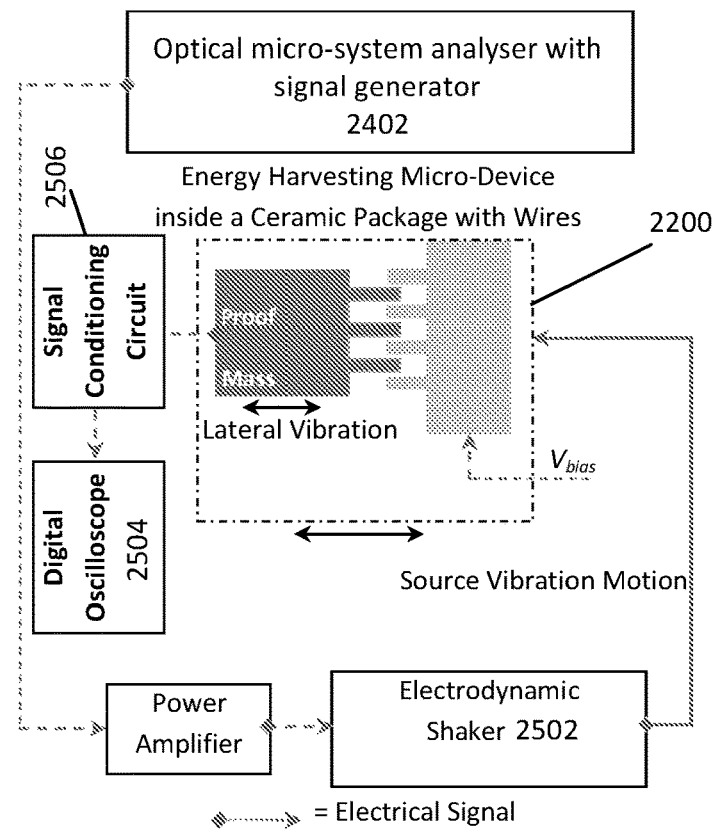
FIG. 25 is a block diagram of the testing apparatus for measuring the frequency response of the individual mechanical resonators of FIG. 22 using an electrodynamic shaker to mechanically drive the mechanical resonators into oscillation, and the micro-system analyser to capture images of the oscillations of the mechanical resonators.

In the other test apparatus, as shown in FIG. 25, the ceramic package 2304 containing the energy harvesting assemblies 2200 was mounted on a stinger rod coupled to an electrodynamic shaker 2502 so that the energy harvesting assemblies 2200 could be stimulated by the electrodynamic shaker 2502 acting as a vibration source. The electrodynamic shaker 2502 was used to mimic the vibration characteristics of living insects or bees by varying the vibration frequency and its amplitude. The laser vibrometer 2402 was used to image the resulting mechanical response of each of the three low frequency mechanical resonator structures 2202, 2204, 2206 and the high frequency mechanical resonator structure 2212. The generated electrical power was characterised using a digital oscilloscope 2504.

Thus, both the electrical and mechanical stimulation test apparatuses of FIGS. 24 and 25 used the laser vibrometer 2402 to excite the MEMS devices into oscillatory motion and to characterize their resulting displacements. The driving signals, the LED (light emitting diode)-strobe flashes, and the camera exposure of the laser vibrometer were synchronized during measurement. The periodic motions of the MEMS structures were frozen in time by using a nano-second strobed illumination source. Furthermore, the short light pulses can record the position of the measured device at precise phase angles relative to the stimulation signals, as determined by the number of strobe shots per period. In other words, the entire oscillatory cycle of each micro-structure was measured by shifting the timing of those pulses by small phase angle increments, resulting in plots in frequency and time domains.

In order to test and characterise the performance of the energy harvesting assemblies, individual packaged energy harvesting assemblies were evaluated using the methodology described in A. Ongkodjojo Ong and F. E. H. Tay, "Motion characterizations of lateral micromachined sensor based on stroboscopic measurements", *IEEE Sensors Journal*, Vol. 7, No. 2, pp. 163-171, February 2007. Briefly, the measurement procedure can be summarized as follows: (1) establish the electrical connections between the micro-system analyzer (MSA-400) 2402 and the energy harvesting assembly 2200 as shown in FIG. 24 or FIG. 25, (2) adjust the measurement settings and lens calibration (measurement mode, excitation and flash frequency, illumination, contrast, device actuation, and frequency range), (3) run the measurement, consisting of image recording & processing, and (4) run the evaluation process based on pattern matching (search pattern and region of interest) consisting of image processing & computing process.

The power output of each energy harvesting assembly 2200 was measured directly through a signal conditioning circuit 2506 while applying the bias voltage ($V_{bias}$) across the interdigitated finger electrodes, as shown in FIG. 25. The bias voltage ($V_{bias}$) was obtained from an external power supply or batteries. The oscillatory motion of the high frequency mechanical resonator structure 2212 gives rise to corresponding changes in capacitance ($dC_v/dt$), and consequently to the electrical charge on the capacitor plates (i.e. dQ/dt), generating a corresponding electrical current I(t) flowing through the signal conditioning circuit 2506 and the load, such as a resistive load. The voltage drop can be then measured across the load resistance ($R_{Load}$) using the digital oscilloscope 2504 (or a multimeter).

A. Measured Resonant Frequencies

Table 6 below summarises the analytical results, FEA results, and experimental results for the energy harvesting assemblies 2200. The table also shows that there is good agreement among those results to within 5%, except for the 2D simulation. The discrepancies be attributed to the use of simplified models, the limited simulation accuracy of the FEM & FEA, minor variations in the microfabrication processes (especially, during the DRIE etching processes), vibration noise from the environment, and the limited measurement accuracy of the laser vibrometer 2402.

3.5 kHz on average, with a standard deviation of 0.39, a standard error of 0.05, and a total uncertainty of 11.55% including an instrument uncertainty of 2%. The uncertainties are thus mainly caused by the factors described above.

Figure 27:
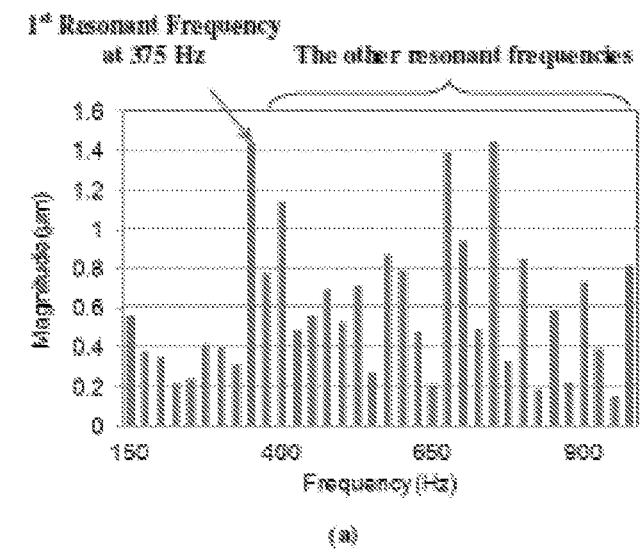
FIG. 27 includes three Bode plots showing the frequency responses of the three low-frequency mechanical resonators, respectively.
Figure 27:
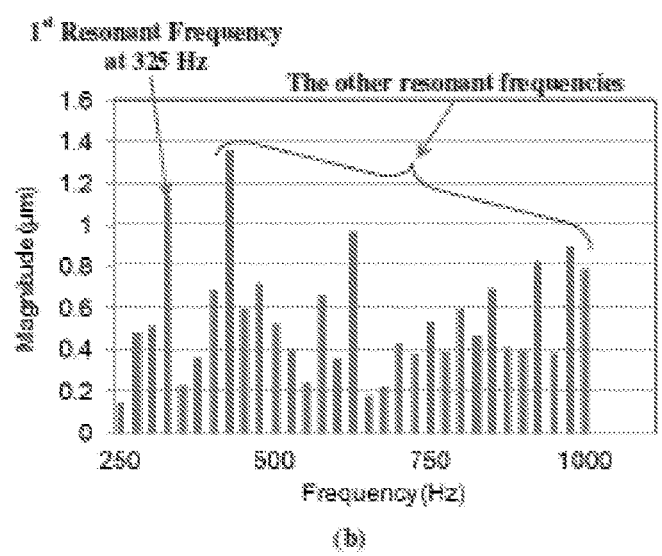
Figure 27:
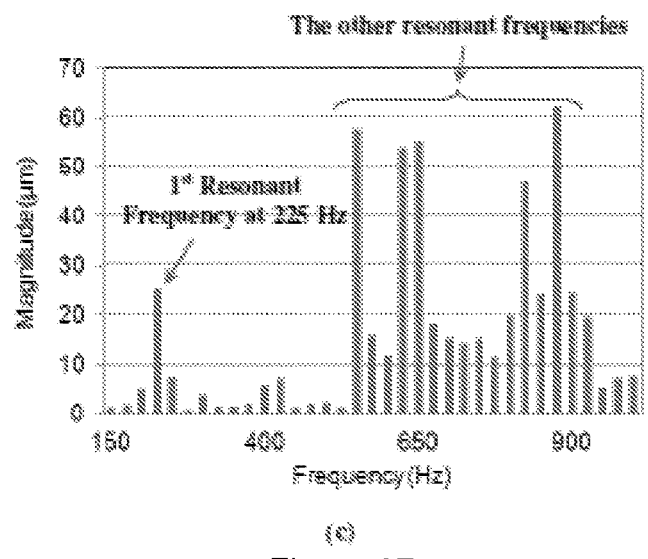

FIG. 27 demonstrates further validations for the three microfabricated low frequency mechanical resonator structures 2202, 2204, 2206, as also summarised in Table 6. FIG. 27(a) shows the frequency spectrum of the first low frequency mechanical resonator structure 2202, with the highest magnitude occurring at the first resonant frequency of 375 Hz. Other resonant frequencies with comparable mag-

TABLE 6

Comparisons of resonant frequencies determined by analytical modelling, three-dimensional (3D) Finite Element Model (FEM) & Finite Element Analysis (FEA), and experimental results for each of the three low frequency mechanical resonator structures 2202, 2204, 2206 and the high frequency mechanical resonator structure 2212 of the energy harvesting assemblies 2200.

| COMPARISONS | MAIN ENERGY HARVESTER (kHz) | MICRO-ACTUATORS | | | |
|---|---|---|---|---|---|
| | | DEVICE 1 (SMALLEST ONE, Hz) | DEVICE 2 (MEDIUM ONE, Hz) | DEVICE 3 (LARGEST ONE, Hz) | INTERMEDIATE SPRINGS (Hz) |
| Analytical Model | 3.43 | 377.2 | 297 | 219.1 | 274.5 |
| Finite Element Analysis (FEA) | 3.46 | 391.7 | 309.5 | 230.2 | 269.4[c] |
| Experiments[a] | 3.52[b] | 375 | 300 | 225 | 200 |

[a]The experimental results were obtained based on the first resonant frequencies.
[b]The measured resonant frequency is based on the average of 60 measurements for six energy harvesting assemblies nominally having the same designs, configurations, materials, and microfabrication processes. The measurement uncertainty is 11.55% based on the randomized measurement technique and the statistical method described in Paulo A de Souza Jr and Gutemberg Hespanha Brasil, "Assessing Uncertainties in a Simple and Cheap Experiment", *European Journal of Physics*, 30 (2009), pp. 615-622 ("de Souza").
[c]The simulation result was obtained using a two-dimensional (2-D) finite element model (FEM) due to the computational cost and complexity of the 3D simulation.

Figure 26:
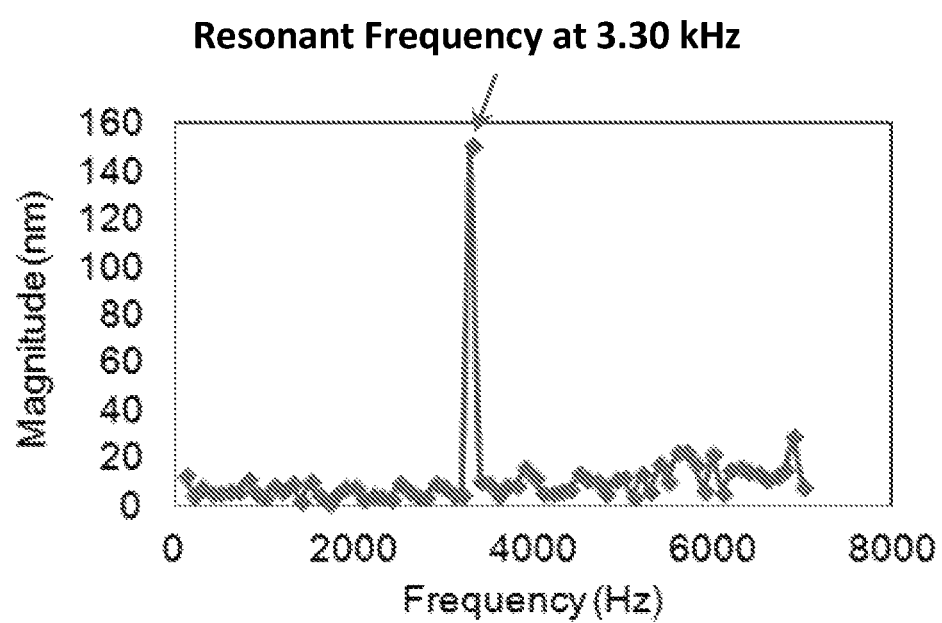
FIG. 26 is a Bode plot showing the frequency response of the high-frequency mechanical resonator driven by applying electrical signals across its comb-drive electrodes, revealing a sharp resonance at a frequency of 3.3 kHz.

FIG. 26 is a graph of the maximum displacement of the high frequency resonator structure 2212 as a function of the frequency of the applied AC and DC drive signal, showing a sharp resonance at a frequency of 3.3 kHz. The small magnitudes of the frequency response are due to the low driving voltage ($V_{AC}=V_{DC}=5$ V), and higher applied voltages cause correspondingly greater displacements. The measurement accuracy depends on the number of strobe shots per oscillation period and on the pattern matching (image processing) used to generate a quantified displacement result from each image. Increasing the number of strobe shots per oscillation period decreases the phase step size, increasing the number of captured images and the measurement accuracy. These measurements were made using 120 strobe shots per oscillation period, and a band frequency up to 7 kHz. However, there is still some vibration noise with the smaller magnitudes, due to Brownian motion as the small moving parts are especially susceptible to mechanical noise resulting from molecular agitation, as shown in the graphs. Noise is also caused by the environment, and the energy harvesting assemblies can be sealed under vacuum to reduce such noise.

Table 6 shows that the measured resonant frequencies of the main energy harvesters are valid and accurate as the experiments were run many times for different microfabricated energy harvesting assemblies and using the same experimental setup, settings, and environment. Sixty independent measurements were made, employing the randomized measurement technique and standard statistical method described in de Souza, on six nominally identical microfabricated energy harvesting assemblies 2200. Based on the randomized technique and statistical standard method, the measured resonant frequency of the main energy harvester is nitudes occur at frequencies of 425 Hz, 700 Hz, and 775 Hz, respectively. When the electrodynamic shaker with the attached stinger rod acts as a vibration source, the whole energy harvesting assembly 2200 was vibrated. Moreover, the supporting springs of the low frequency mechanical resonator structures 2202, 2204, 2206 are more sensitive to external vibrations compared with the supporting beams 2218 of the high frequency resonator structure 2212, because the former were specifically designed with a low stiffness (small spring constant), resulting in higher displacements or vibrations. Spring softening effects are thus more significant for the low frequency mechanical resonator structures 2202, 2204, 2206 than for the high frequency resonator structure 2212. The graphs also demonstrate that the low frequency mechanical resonator structures 2202, 2204, 2206 can respond to external vibrations having frequencies that are higher than the low operating frequency range. Thus, the measured resonant frequencies for the low frequency mechanical resonator structures 2202, 2204, 2206 are 375 Hz, 325 Hz, and 225 Hz as shown in FIGS. 27(a), (b), and (c), respectively.

B. Measured Power Output

Figure 28:
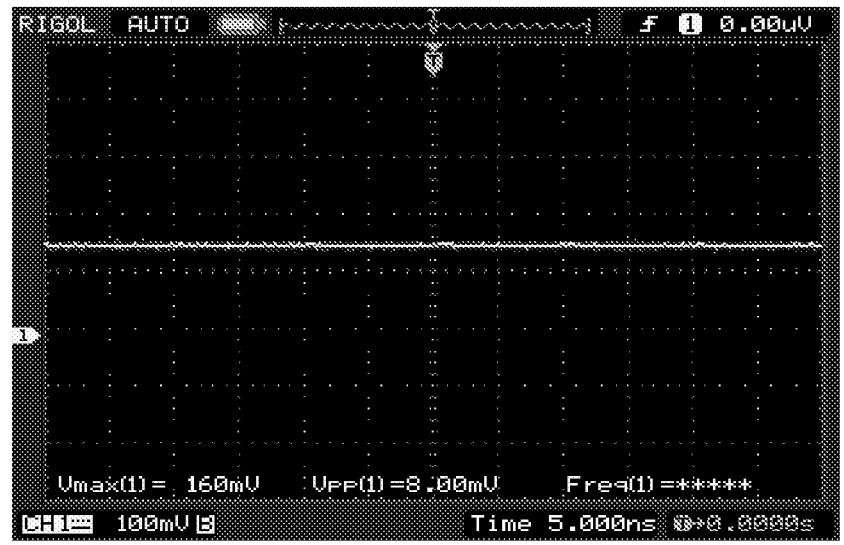
FIG. 28 includes two oscilloscope screen images showing the output generated by an energy harvesting assembly mounted to a stinger rod coupled to the electrodynamic shaker, with the latter switched off (FIG. 28 (a)) and (FIG. 28 (b)) driven by a 3.0 $V_{pp}$ signal at 300 Hz supplied to the electrodynamic shaker via a power amplifier.
Figure 28:
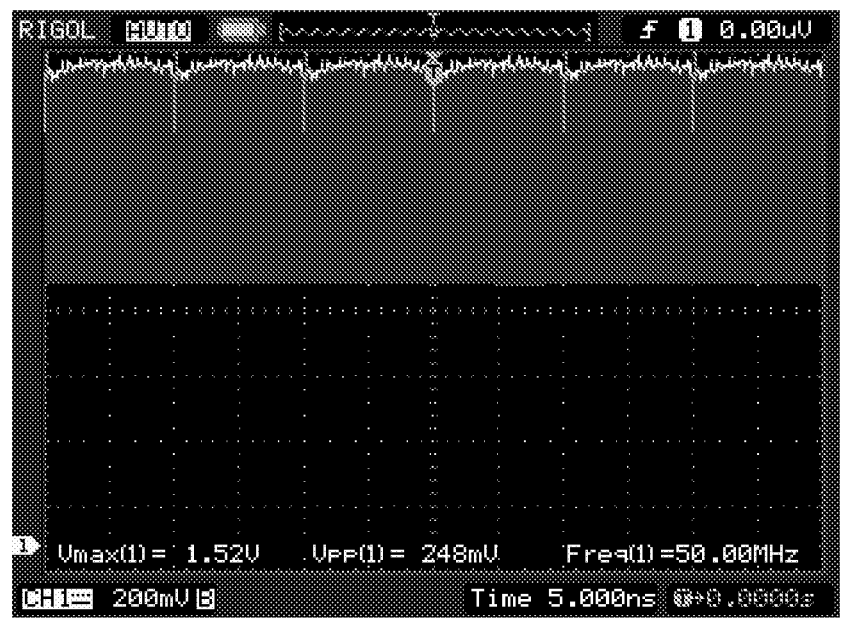

The electrical power output of the energy harvesting assemblies 2200 was determined by measuring the voltage drop across a resistive load for a low mechanical stimulation frequency of 300 Hz, and a drive signal amplitude of 3.0 $V_{pp}$ from the signal generator, employing the electrodynamic shaker and its compatible power amplifier, in addition to the signal conditioning circuit (i.e. a voltage-doubler rectifier or a full-bridge rectifier) to rectify the output signals from the energy harvesting assemblies 2200. To provide the electric bias charge for the energy harvesting assemblies 2200, a DC voltage bias was applied across the comb drive capacitor plates. All the power output measurements were obtained by subtracting the initial and small output level (when the shaker was OFF), as shown in FIG. 28(a), from the highly increasing voltage level (when the shaker was turned ON) as shown in FIG. 28(b). Based on the measurement procedure, the power output was determined using Ohm's law.

Similar to the measurements of resonant frequencies described above, the power output was measured by making 60 independent measurements, and employing the randomized measurement technique and standard statistical method described above, and using the same experimental setup, settings, and environment. Specifically, the measurements were performed at a low vibration frequency (i.e. 300 Hz) of the electrodynamic shaker with an amplitude of 3.0 $V_{pp}$ sine-wave signal, which was generated by the signal generator through the power amplifier connected to the shaker for providing vibrations to the energy harvesting assemblies 2200. An average acquisition using the maximum available number of measurements (256) of the digital oscilloscope was employed for all the measurements to minimise signal noise.

Based on the described measurement method, the measured power output of the energy harvesting assemblies 2200 was ~21 mW on average, with a standard deviation of 0.70, a standard error of 0.09, and a total uncertainty of 22%, including an instrument uncertainty of 4%. The uncertainties are mainly caused by minor variations between fabricated instances of the energy harvesting assemblies 2200 due to variations in the microfabrication processes, the stability of the electrodynamic shaker with its stinger rod, signal noise, ambient noise from the environment, and the measurement accuracy, including the accuracy of observations of the digital oscilloscope display during the experiments.

Figure 29:
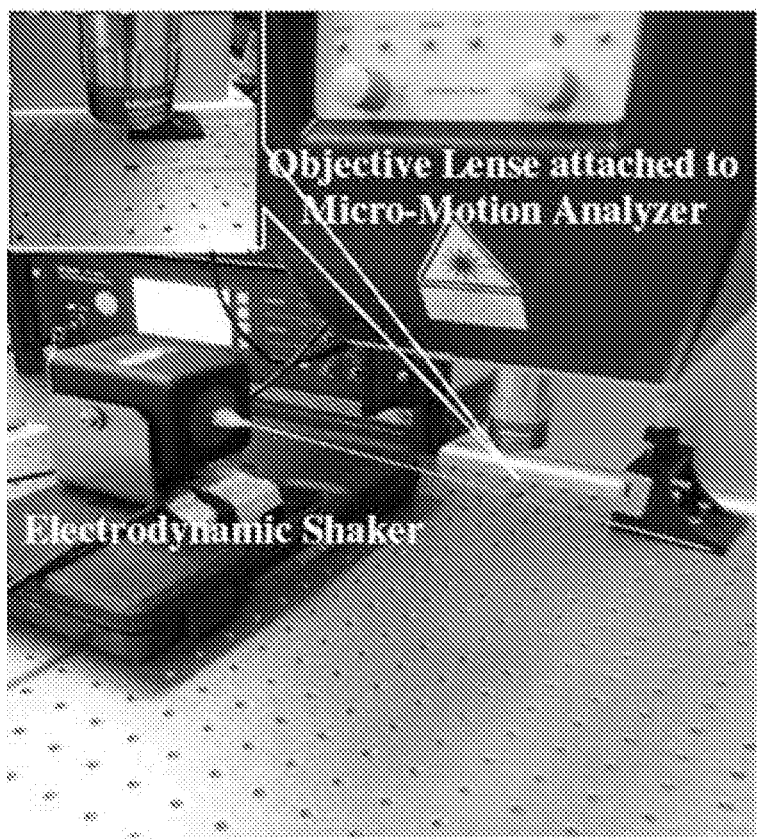
FIG. 29 is a photograph showing the electrodynamic shaker and stinger rod used to drive oscillations of the mechanical resonators, the inset showing a close-up view of an energy harvesting assembly mounted to the stinger rod and being imaged by the micro-system analyser using its microscope objective lens.
Figure 30:
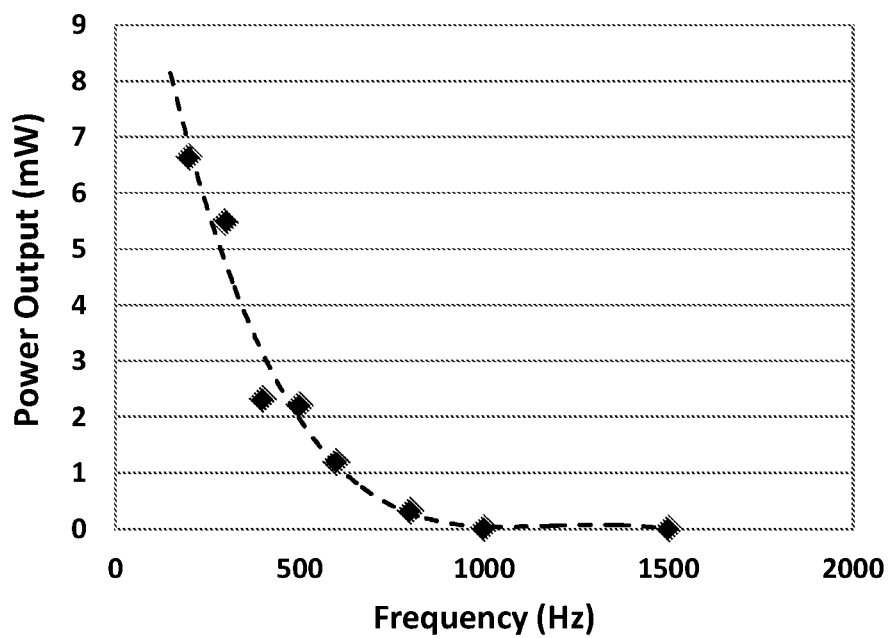
FIGS. 30 to 32 are graphs of the electrical power output generated by the energy harvesting assembly as a function of: (i) the frequency of external mechanical vibrations of the electrodynamic shaker, (ii) load resistance, and (iii) the DC bias applied to the interdigitated finger electrodes of the high-frequency resonator.

By utilizing the electrodynamic shaker setup 2502 to mimic the vibrations of bees or living insects, as shown in FIG. 29, the actual power generation as a function of frequency was measured and the resulting data is shown in FIG. 30. To further demonstrate that the energy harvesting assemblies 2200 operate well as expected, their output power as a function of the load resistance and voltage bias are shown in FIGS. 31 and 32, respectively.

FIG. 30 shows that the microfabricated energy harvesting micro-devices work as expected, with higher power output in the low frequency range of interest. Even though the high frequency mechanical resonator structure 2212 operates at a frequency resonance of ~3 kHz as shown in Table 6 and FIG. 26, the lower frequency range of stimulation actually generates the higher amplitudes of vibrations, as expected. Thus, the power output performance demonstrates that the energy harvesting assemblies 2200 convert lower frequency vibrations to a higher frequency resonance of ~3 kHz (i.e., it acts as a frequency-up converter). In other words, the energy harvesting assemblies 2200 can translate lower amplitudes of structural vibrations into a higher amplitude at the higher resonant frequency (i.e. ~3 kHz) of the high frequency resonator structure 2212 to enhance the power output as shown in FIG. 30.

Figure 31:
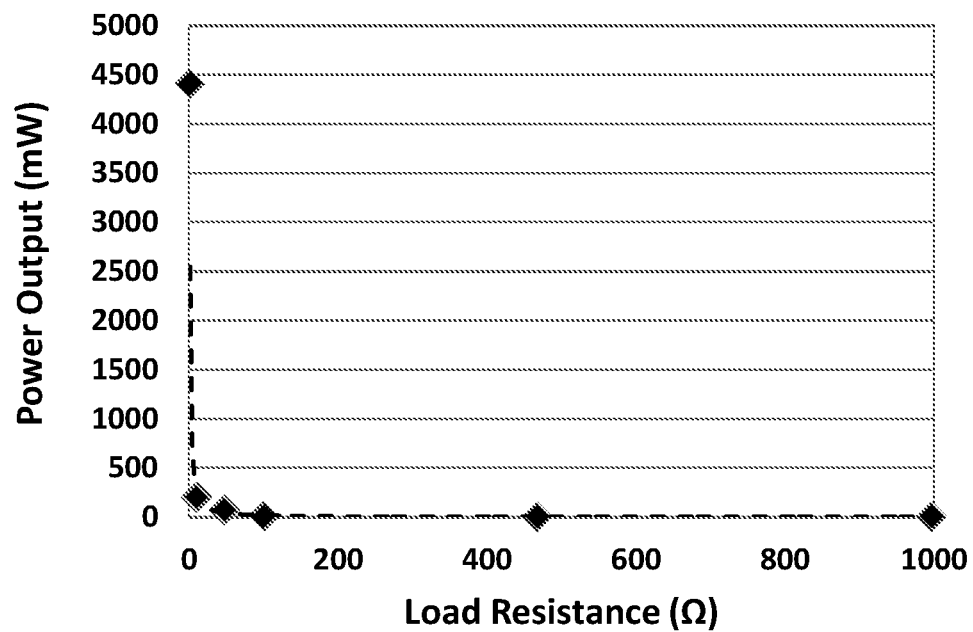
Figure 32:
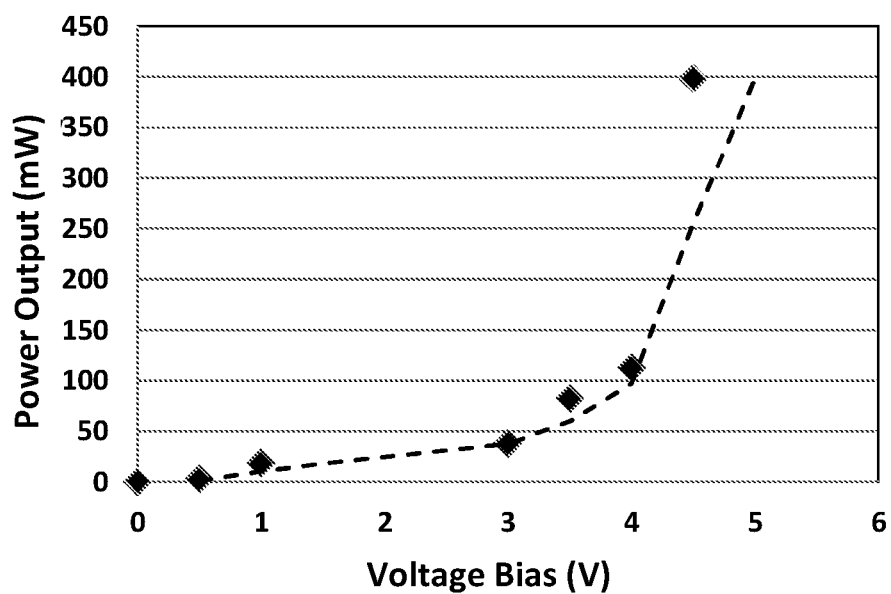

FIG. 31 shows that higher output power is generated at lower load resistances. The energy harvesting assemblies 2200 can provide a maximum output power of ~4.4 W into a resistance load of 1.6Ω for the described measurement setup, measurement settings and environment. In fact, the energy harvesting assemblies 2200 can achieve a power output of ~3.85 mW into a resistive load of 1 kΩ. Furthermore, the energy harvesting assemblies 2200 can achieve a power output of 0.2 µW into a resistive load of 100 kΩ. The lower resistance actually opens more conducting pathways of electrical charges, resulting in higher generating current and power output. Moreover, FIG. 32 demonstrates that the output power increases with increasing voltage bias, also as expected. A higher voltage bias provides a higher source of electrical charges, as the total number of electrical charges is proportional to the voltage bias for the same capacitance. Thus, based on the experimental measurements, the energy harvesting assemblies 2200 described herein demonstrate higher power output than existing energy harvesters of the same physical dimensions, although this depends on the electrical charge density.

Figure 33:
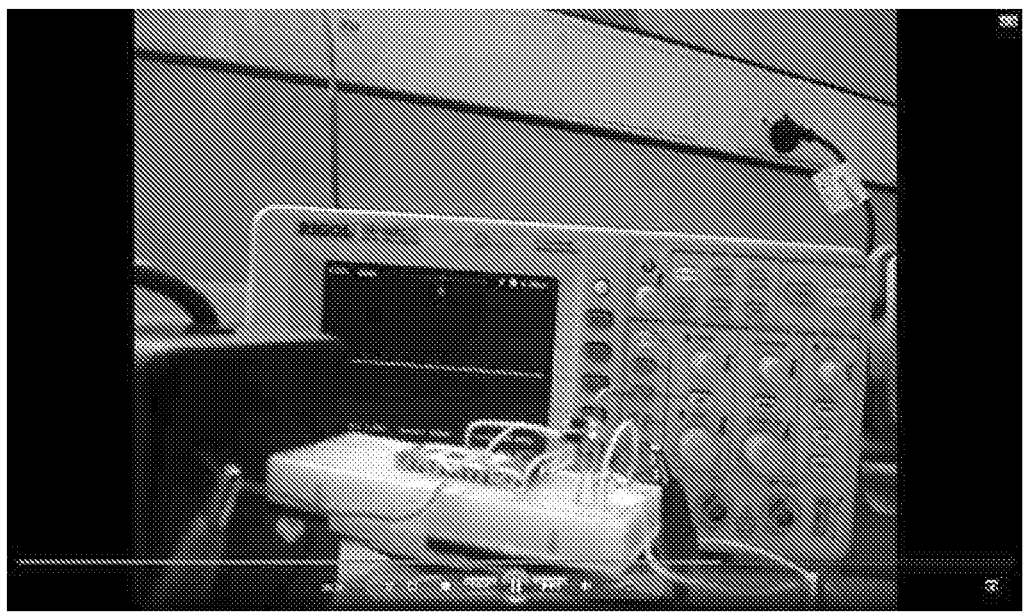
FIG. 33 is a photograph showing an energy harvesting assembly being used to power a light emitting diode (LED) using the electrical energy generated by the energy harvesting assembly from mechanical vibrations of the electrodynamic shaker.

Finally, to further demonstrate that the energy harvesting assemblies 2200 were able to generate high output power, an energy harvesting assembly 2200 stimulated by the electrodynamic shaker operating at 300 Hz was successfully used to power a conventional red light emitting diode (LED), as shown in FIG. 33.

Many modifications will be apparent to those skilled in the art without departing from the scope of the present invention.

The invention claimed is:

1. A micro-electro-mechanical transducer, including:
a plurality of first mechanical resonator structures having respective different first fundamental oscillation resonance frequencies;
a second mechanical resonator structure including one or more electromechanical transducer components, and having a second fundamental oscillation resonance frequency that is substantially greater than the first fundamental resonance frequencies of the first mechanical resonator structures; and
a plurality of variable capacitors associated with the first mechanical resonator structures and/or the second mechanical resonator structure;
wherein the spatial dimensions of the first and second mechanical resonator structures are less than 4 mm;
wherein oscillations of the first mechanical resonator structures driven by external mechanical vibrations cause the first mechanical resonator structures to intermittently couple with the second resonating structure to drive oscillations of the second resonating structure such that the electromechanical transducer components of the second mechanical resonator structure convert the oscillations of the second resonating structure to 1) electrical energy using the variable capacitors or 2) signals by electrostatic transduction using the variable capacitors;
wherein each of the first mechanical resonator structures includes one or more coupling members extending towards the second resonating structure such that oscillations of the first mechanical resonator structure cause the coupling members to intermittently press against the second resonating structure and thus drive the oscillations of the second resonating structure; and
wherein the second mechanical resonator structure includes a proof mass suspended by elongate beams such that the oscillations of the second mechanical resonator structure are in opposing directions that are orthogonal to the longitudinal axes of the elongate beams.

2. The micro-electromechanical transducer of claim 1, wherein the external mechanical vibrations span a range of frequencies, and the respective different first fundamental oscillation resonance frequencies collectively and substantially correspond to that range of frequencies.

3. The micro-electromechanical transducer of claim 1, wherein the first mechanical resonator structures are mutually independent.

4. The micro-electromechanical transducer of claim 1, wherein the first mechanical resonator structures are mutually coupled by coupling springs.

5. The micro-electromechanical transducer of claim 1, wherein each said first mechanical resonator structure includes a proof mass suspended by serpentine springs.

6. The micro-electromechanical transducer of claim 5, wherein the serpentine springs are arranged such that the oscillations of each proof mass said first mechanical resonator structure are in alternating directions directed towards and away from the corresponding serpentine leaf springs that support the proof mass.

7. An energy harvester including the micro-electromechanical transducer of claim 1.

8. A micro-electromechanical transduction process, including:
   coupling mechanical vibrations to a plurality of first mechanical resonator structures having respective different first fundamental oscillation resonance frequencies corresponding to respective frequencies of the mechanical vibrations, such that the coupling causes one or more of the first mechanical resonator structures to oscillate;
   coupling the oscillations of the first mechanical resonator structures to a second mechanical resonator structure via one or more coupling members of the first mechanical resonator structures that intermittently press against the second resonating structure and thus drive oscillations of the second resonating structure, the second resonating structure including one or more electromechanical transducer components and having a second fundamental oscillation resonance frequency that is substantially greater than the first fundamental resonance frequencies of the first mechanical resonator structures, such that the oscillations of the first mechanical resonator structures drive oscillations of the second resonating structure and the electromechanical transducer components of the second resonating structure convert the oscillations of the second resonating structure to 1) electrical energy using variable capacitors or 2) signals by electrostatic transduction using variable capacitors.

* * * * *